United States Patent
Kang

(10) Patent No.: US 7,782,252 B2
(45) Date of Patent: Aug. 24, 2010

(54) SYSTEM AND METHOD FOR GPS SIGNAL ACQUISITION

(76) Inventor: Inchul Kang, 239 Jo Dr., San Jose, CA (US) 95032

( * ) Notice: Subject to any disclaimer, the term of this patent is extended or adjusted under 35 U.S.C. 154(b) by 342 days.

(21) Appl. No.: 11/956,307

(22) Filed: Dec. 13, 2007

(65) Prior Publication Data

US 2008/0297411 A1 Dec. 4, 2008

Related U.S. Application Data

(60) Provisional application No. 60/941,653, filed on Jun. 2, 2007.

(51) Int. Cl.
*G01S 1/00* (2006.01)
(52) U.S. Cl. .................................. 342/357.15
(58) Field of Classification Search ................................ 342/357.01–357.17
See application file for complete search history.

(56) References Cited

U.S. PATENT DOCUMENTS

| | | | |
|---|---|---|---|
| 5,781,156 A | 7/1998 | Krasner | |
| 5,897,605 A | 4/1999 | Kohli et al. | |
| 5,960,033 A | 9/1999 | Shibano et al. | |
| 6,028,883 A | 2/2000 | Tiemann et al. | |
| 6,104,340 A | 8/2000 | Krasner | |
| 6,118,808 A | 9/2000 | Tiemann et al. | |
| 6,330,274 B1 | 12/2001 | Uehara | |
| 6,526,322 B1 | 2/2003 | Peng et al. | |
| 6,590,525 B2 | 7/2003 | Yule et al. | |
| 6,891,880 B2* | 5/2005 | Abraham | 375/142 |
| 6,891,884 B1 | 5/2005 | Ohnishi | |
| 6,917,329 B2 | 7/2005 | Dougherty | |
| 2003/0128746 A1* | 7/2003 | Lerner et al. | 375/148 |
| 2004/0122881 A1 | 6/2004 | Mattos et al. | |
| 2006/0023776 A1 | 2/2006 | Hsu | |
| 2009/0289841 A1* | 11/2009 | Nakamoto et al. | 342/357.02 |

* cited by examiner

*Primary Examiner*—Thomas H Tarcza
*Assistant Examiner*—Nga X Nguyen
(74) *Attorney, Agent, or Firm*—Clifford Perry

(57) ABSTRACT

A method for acquiring a GPS signal includes receiving a GPS signal portion over a coarse acquisition (C/A) frame period. The received GPS signal portion is stored and correlated to each of a plurality of versions of a reference coarse acquisition code to obtain a respective plurality of autocorrelation values. A peak value is selected among the autocorrelation values, the peak value corresponding to a version of the reference coarse acquisition code which is most aligned with the received GPS signal.

20 Claims, 21 Drawing Sheets

SYSTEM AND METHOD FOR GPS SIGNAL ACQUISITION

CROSS-REFERENCE TO RELATED APPLICATIONS

This application claims the benefit of priority of U.S. provisional patent application 60/941,653 filed Jun. 2, 2007 entitled "System and Method for GPS Signal Acquisition Using Real-Time Analog Snapshot," the contents of which are herein incorporated by reference in its entirety for all purposes.

BACKGROUND

The present invention relates in general to spread-spectrum systems, and more particularly to systems and methods for acquiring geo-location using a snapshot of the GPS (Global Positioning System) signal.

The Global Positioning System (GPS) is a global navigation system made up of a constellation of orbiting navigation satellites receivers. A GPS receiver uses signals received from three or more of the GPS satellites to determined navigational data, such as position and velocity. The GPS receiver is able to determine position and speed information by computing the relative times of arrival of the GPS signals that are simultaneously transmitted from a multiplicity of GPS satellites.

Each satellite transmits its navigation message with at least two distinct spread spectrum codes: a publicly available Coarse/Acquisition (C/A) code, and a Precise (P) code, which is usually encrypted and reserved for military applications. The C/A code is a 1,023 chip pseudo-random code, the C/A code having a repetition period of 1 millisecond. Each satellite transmits its own C/A code, so that it can be uniquely identified and received separately from the other satellites transmitting on the same frequency.

FIG. 1 illustrates a conventional approach used to acquire a GPS signal known in the art. In the conventional approach, a GPS receiver generates a local C/A code $110a$ composed of N+1 "chips" $c_0$-$c_N$; where N=1022 which it uses to autocorrelate with a received GPS signal $120a$ over a first C/A code frame period $130a$, the result $140a$ being output or stored. The GPS receiver repeats the aforementioned processes, whereby the local C/A code 110 is advanced or delay by a predetermined number of chips (e.g., 1 bit advanced as shown), the shifted local C/A code $110b$ is autocorrelated with a received GPS signal $120b$ over a second C/A code frame period $130b$, and the result $140b$ output or stored. The GPS receiver continues repeating the aforementioned processes for n iterations, whereby the nth version of the local C/A code $110n$ is autocorrrelated with a received GPS signal $120n$ acquired over an nth C/A code frame period $130n$, the result $140n$ output or stored. The autocorrelated outputs are compared, the result having the largest magnitude (shown as $140n$) indicating the local C/A code version $110n$ having the best alignment with the received GPS signal. The receiver selects the local C/A code version providing the highest correlated out with the received GPS signal as its local C/A code for further processing of the GPS signal.

While the prior art method is generally effective in acquiring the GPS signal, the processing time required to autocorrelate the local C/A code with the GPS signal in the aforementioned serial fashion is time consuming. In the worst case, autocorrelation of all C/A code versions is required until the correct C/A code is identified, resulting in a worst case processing time of (1,023 chips/frame 1 ms), or 1.023 seconds until the GPS signal is positively acquired. A delay of this magnitude is problematic in various respects, for example, location or speed information will not be accurate when the receiver is in motion. There are many prior arts employing the massive parallel correlators to expedite acquisition process at higher implementation cost and power consumptions. Almost all these solutions are implemented digitally by sacrificing sensitivity by quantizing GPS signal with 1 or 2 bits to alleviate some implementation cost and power consumption.

What is needed is a system and method that provides for faster GPS signal acquisition at very low implementation cost and power consumption, and maintains high sensitivity.

SUMMARY

The present invention provides a fast acquisition GPS system and method in which a single GPS signal snap shot is used, compared with the conventional approach in which many iterations of the GPS signal is needed.

One embodiment of the invention provides a method for acquiring a GPS signal in which a GPS signal portion is received over a coarse acquisition (C/A) frame period. The received GPS signal portion is stored, and the same GPS signal portion is correlated to each of a plurality of versions of a reference coarse acquisition code at a high speed to obtain a respective plurality of autocorrelation values. A peak value is selected among the autocorrelation values, the peak value corresponding to a version of the reference coarse acquisition code which is most aligned with the received GPS signal.

This and other features of the invention will be better understood in light of the following drawings and detailed description.

For clarity, previously identified features retain their reference indicia in subsequent drawings.

DETAILED DESCRIPTION OF EXEMPLARY EMBODIMENTS

In the following description and in the accompanying drawings, specific terminology and drawing symbols are set forth to provide a thorough understanding of the present invention. In some instances, the terminology and symbols may imply specific details that are not required to practice the invention.

Figure 1:
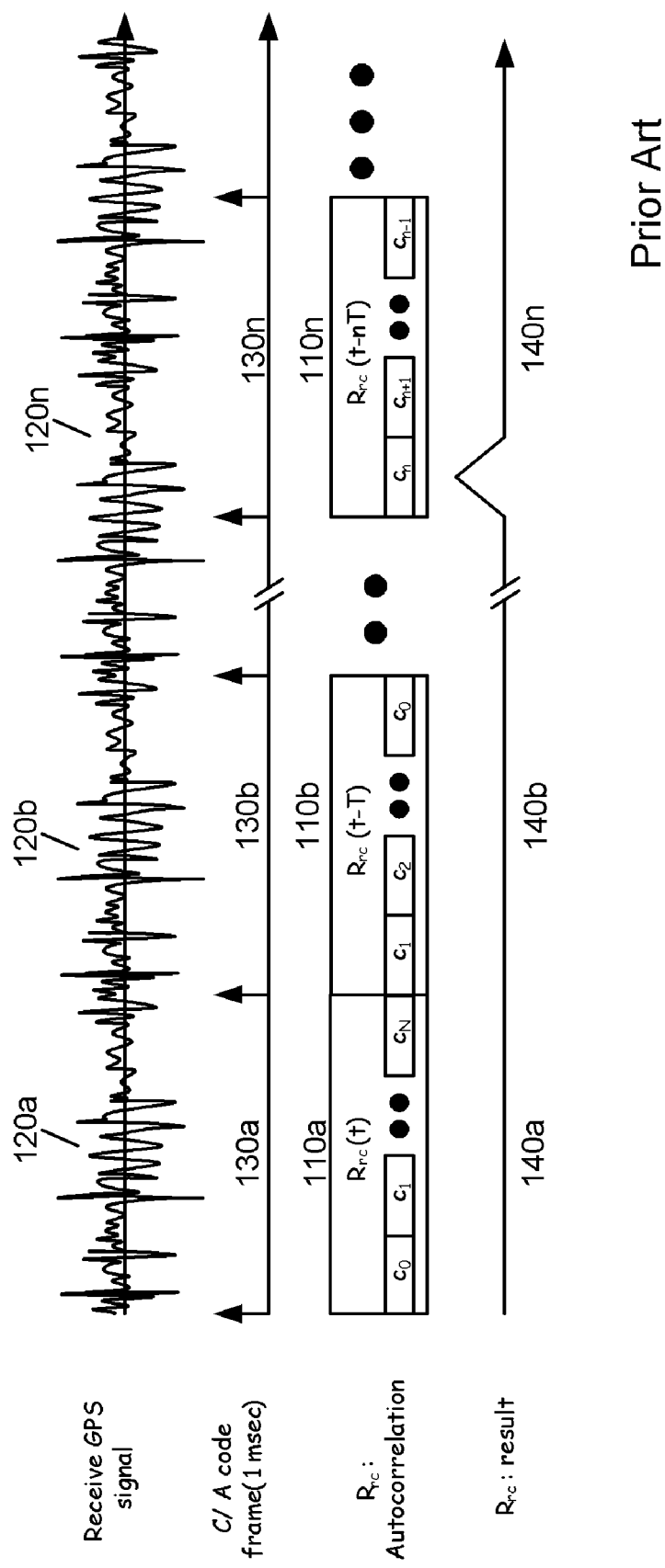
FIG. 1 illustrates a conventional approach used to acquire a GPS signal known in the art.
Figure 2:
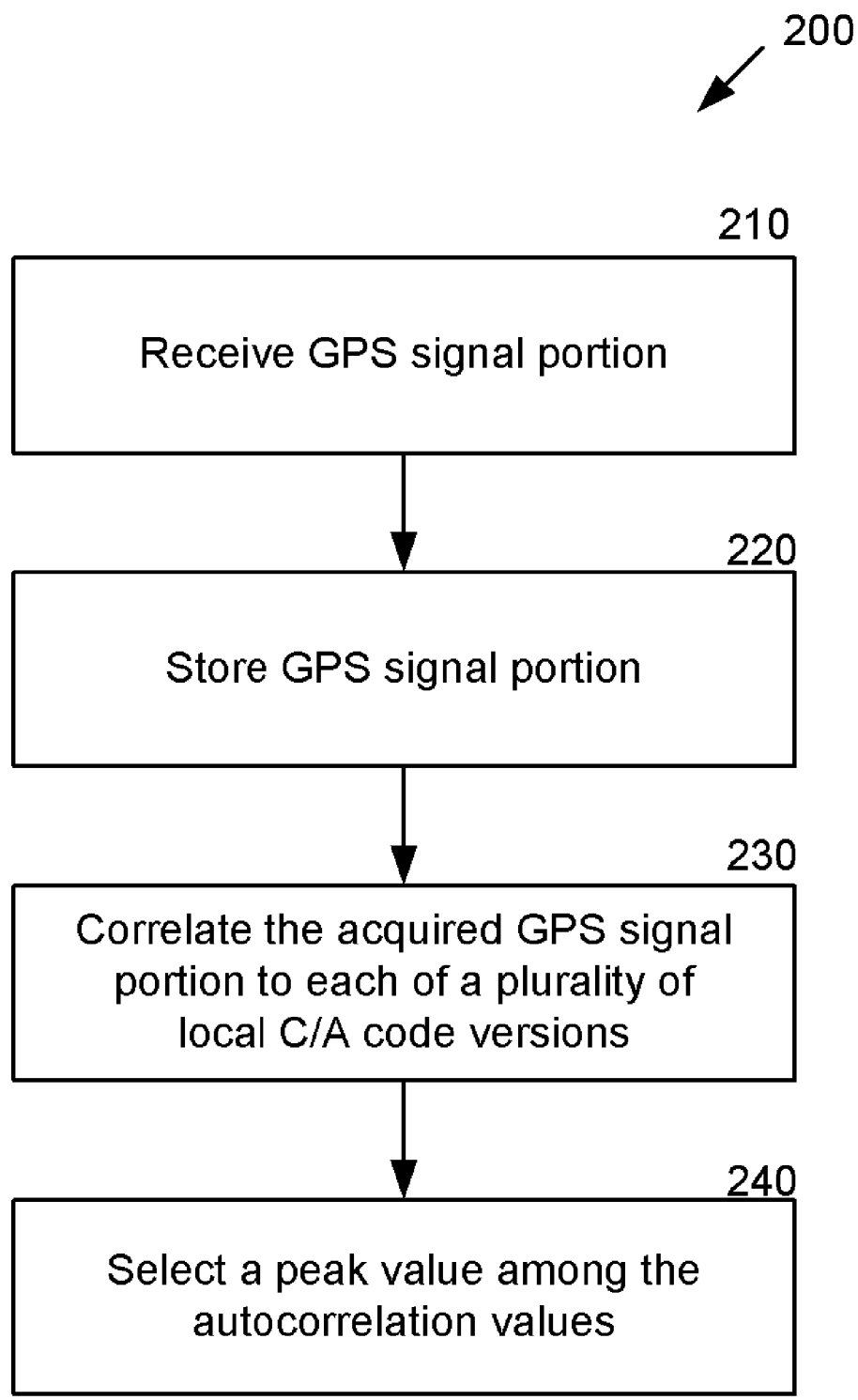
FIG. 2 illustrates a method for acquiring a GPS signal in accordance with one embodiment of the present invention.

FIG. 2 illustrates a method 200 for acquiring a GPS signal in accordance with one embodiment of the present invention. The method includes receiving a portion of a GPS signal at 210, the GPS signal having a predefined coarse acquisition (C/A) frame period. The received GPS signal portion is stored at 220. At 230, the received GPS signal portions is correlated to each of a plurality of versions of a reference coarse acquisition (C/A) code to obtain a respective plurality of autocorrelation values, and at 240, a peak value is selected among the autocorrelation values.

In an exemplary embodiment, operation 230 may be performed by: (i) correlating the received GPS signal portion to a reference coarse acquisition code to obtain a first autocorrelation value; (ii) circularly-shifting the reference coarse acquisition code to obtain a shifted reference coarse acquisition code; and (iii) correlating the received GPS signal portion to the circularly-shifted reference coarse acquisition code to obtain a second autocorrelation value. Further particularly, (ii) and (iii) may be repeated until the reference C/A code has shifted through one complete revolution, whereby the received GPS signal portion is correlated to each of the reference and shifted versions of the C/A code. Further exemplary, the collective period over which the received GPS signal is correlated to each of the reference and shifted versions of the C/A code is less than or equal to the C/A frame period.

Figure 3:
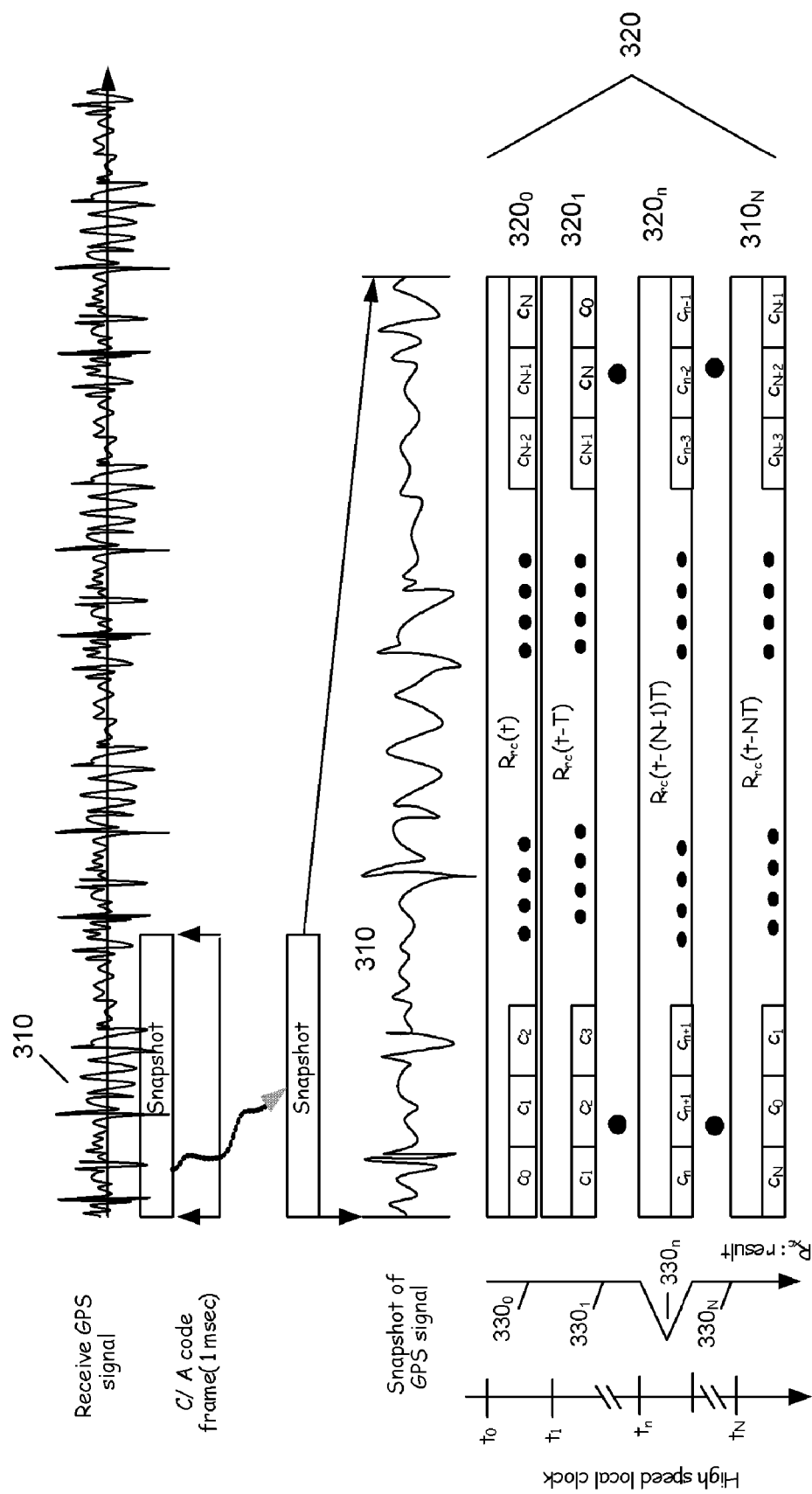
FIG. 3 illustrates an exemplary embodiment of the method illustrated in FIG. 2 in accordance with one embodiment of the present invention.

FIG. 3 illustrates an exemplary embodiment of the method illustrated in FIG. 2 in accordance with the present invention. A GPS signal portion 310 is received over a coarse acquisition (C/A) frame period, and the GPS "snap-shot" 310 is stored in a memory, such as an analog Sample and Hold circuit. The received GPS signal portion 310 is correlated to each of a plurality of versions $320_0$-$320_N$ of a local/reference coarse acquisition (C/A) code 320 to obtain a respective plurality of autocorrelation values $330_0$-$330_N$. A peak value $330_n$ is selected among the autocorrelation values $330_0$-$330_N$, the peak value $330_n$ corresponding to the version of the local C/A code having the best alignment with the acquired GPS signal. In a particular embodiment, this last operation may included the operations of comparing the magnitude of the autocorrelation values $330_0$-$330_N$; and selecting the larger of the autocorrelation values $330n$ as the peak autocorrelation value, the peak autocorrelation value $330_n$ corresponding to the local C/A code $310_n$ which is most closely aligned to the acquired GPS signal portion.

In an exemplary embodiment, the process of correlating the acquired GPS signal includes the processes of (i) correlating the received GPS signal portion 310 to a reference coarse acquisition code $320_0$ to obtain a first autocorrelation value $330_0$; (ii) circularly-shifting the reference coarse acquisition code $320_0$ to obtain a shifted reference coarse acquisition code $320_1$; and (iii) correlating the received GPS signal portion 310 to the circularly-shifted reference coarse acquisition code $320_1$ to obtain a second autocorrelation value $330_1$. Furthermore, the operations of (ii) and (iii) may be repeated until the reference C/A code has shifted through one complete revolution (ending with C/A code $320_N$, as shown), whereby the received GPS signal portion is correlated to each of the reference and shifted versions of the local C/A code. The local C/A code may be shifted (advanced or delayed) by any predetermined number of C/A code chips, for example 1, 2, 3, 4, 5, 10, 20, 100, 500 or more chips. Described in another way, the acquired GPS signal may be correlated to any plurality of different local C/A code versions, for example, 2, 3, 4, 5, 10, 20, 50, 100, 200, 500, 1,000, or 1,023 versions of the C/A code.

Further particularly, the rate at which the received GPS signal portion is correlated to the collective plurality of local C/A code versions is greater than or equal to than the C/A frame rate. For example, the correlation rate used to generate results $330_0$-$330_N$ may be on the order of 1 MHz or higher. Described in another way, the period over which the received GPS signal portions is correlated to the collective plurality of the local C/A code versions (i.e., $t_0$-$t_N$) is shorter than or equal to the C/A frame period (i.e., 1 ms). In such an arrangement, all of the required correlations are executed and a peak value selected therefrom during one C/A code frame. When so arranged, the GPS system is operable to receive the GPS signal portion and subsequently acquire the GPS signal in a total of at most two C/A code frame periods (one C/A code frame for receiving the GPS signal, and one C/A code frame for completing the required autocorrelation operations), i.e., 2 ms in the worst case scenario compared to 1 second in the conventional single correlator approach. Further particularly, the GPS reception, storage, and autocorrelation processes may be "pipelined," such that the receiver is operable to receive and store subsequent GPS signals concurrently with the aforementioned correlation processes. In such an arrangement, subsequent autocorrelation processes are carried out upon a GPS snapshot received one C/A frame period before, i.e., two GPS snapshot capture and autocorrelation operations can be carried out in three C/A frame periods, or 3 ms. Further particularly, the GPS reception, storage, and autocorrelation processes may be "ping-ponged," such that the receiver is operable to receive and store subsequent GPS signals concurrently with the aforementioned correlation processes. In such an arrangement, while subsequent autocorrelation processes are carried out upon a GPS snapshot received less than one C/A frame period before, i.e., ½ GPS snapshot capture and autocorrelation operations can be carried out and summed.

Figure 4:
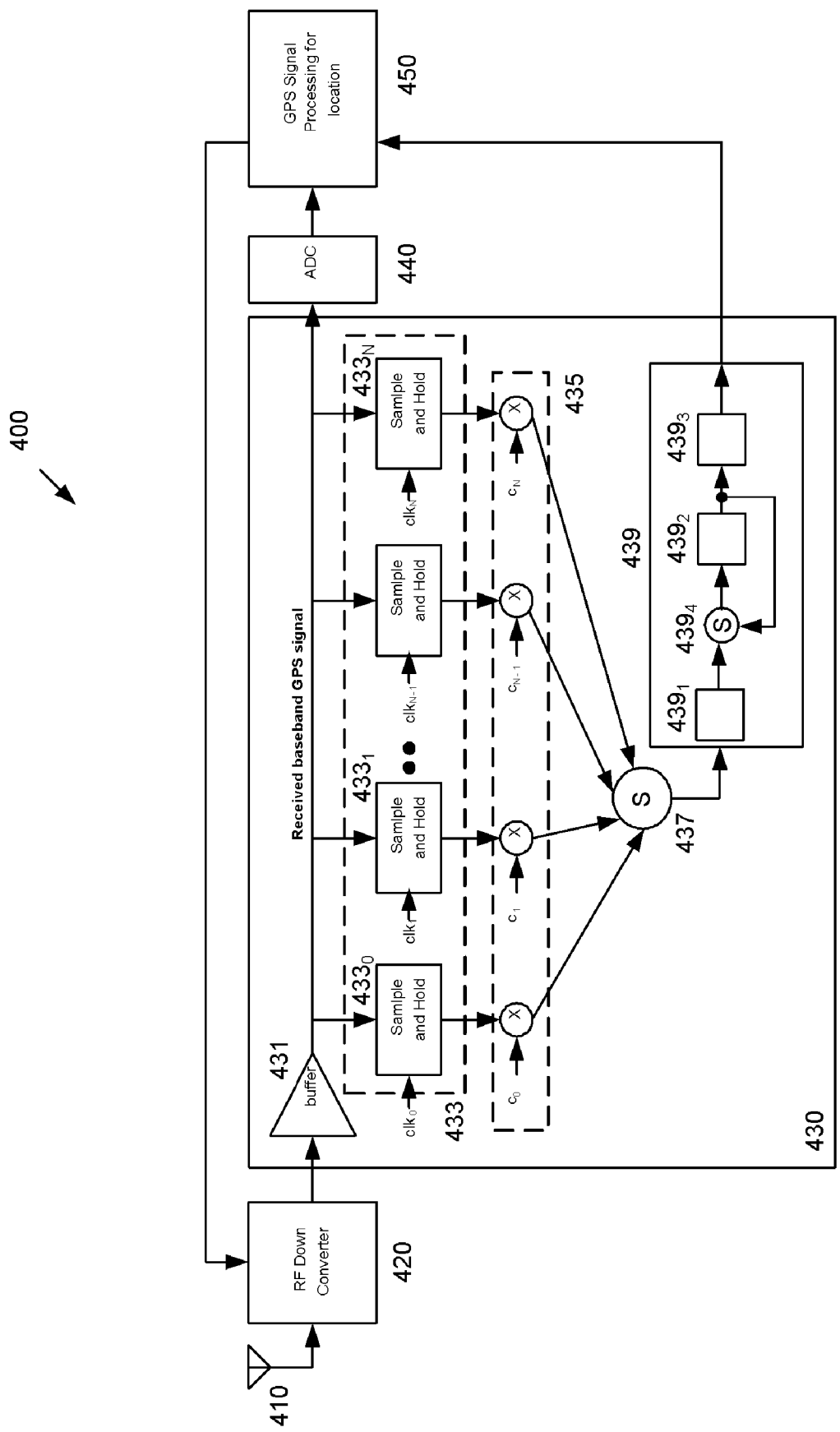
FIG. 4 illustrates a simplified block diagram of a GPS signal receiver employing sample and hold circuits in accordance with one embodiment of the present invention.

FIG. 4 illustrates a simplified block diagram of a GPS signal receiver 400 employing sample and hold circuits in accordance with one embodiment of the present invention. The GPS receiver 400 includes an antenna 410, a radio frequency (RF) downconverter circuit 420, correlation circuit 430, an analog-to-digital converter (ADC) 440, and a GPS processor 450. GPS signals are received by antenna 410 at L1 frequency (1.57542 GHz), and the downconverter circuit 420 provides a near-baseband signal (the "received GPS signal or received GPS signal portion" as described herein). I-phase and Q-phase signals are generated for complex operation. The correlation circuit 430 is used to correlate the received GPS signal portion against the local C/A code. The peak detector 439 is operable to detect if the autocorrelation vector includes a peak (e.g., an amplitude peak) which exceeds a predefined threshold. An N bit wide ADC 440 is used to detect signal strength for AGC (automatic gain control) and also collect ephemeris data which repeats every 30 seconds. An embedded micro-controller 450 is used for triangulation and computing geo-location.

The exemplary correlation circuit 430 includes a buffer amplifier 431, an array of sample and hold circuits 433, an array of correlators 435, a summer 437, and a peak detector 439. The buffer amplifier 431 provides signal amplification and isolation between the correlation circuit 430 and the downconverter circuit 420. Each of the sample and hold circuits 433 is operable to sample and store the received GPS signal portion responsive to supplied clock signal. As will be further described below, each sample and hold circuit 433 receives a differently-timed clock signal for sampling the received GPS signal portion at a different time. Each of the correlators 435 is operable to correlate the sampled GPS signal portion with one of the N+1 chips of the local C/A code. Summer 437 combines all N+1 correlated results to form a complete autocorrelation result vector. The peak detector 439 includes an ADC $439_1$, a memory $439_2$, a peak search circuit $439_3$, and a summer $439_4$. The correlation output is sampled using the n-bit wide (e.g., 8-bit) ADC $439_1$, and summed $439_4$ with the previous result in memory $439_2$ and collected over specified period and the peak is searched by finding the maximum value $439_3$. Subsequently, a new sequence of N+1 chips (e.g., a circularly-shifted version of the previous sequence $c_0$-$c_N$) can be applied to the correlators 435 to provide a second autocorrelation result vector. The process is repeated until a peak above the predefined threshold is detected, the local C/A code version producing said peak being the most aligned with the received GPS signal portion.

The correlation circuit 430 shown in FIG. 4 can be described using the following identifiers:

{$SH_0$, $SH_1$, ... $SH_{N-1}$, $SH_N$}: Sample & hold blocks sampled using gated clock signals
{$clk_0$, $clk_1$, ... $clk_{N-1}$, $clk_N$}: gated clock signals
{$c_0$, $c_1$, ... $c_{N-1}$, $c_N$}: local C/A code chip
{$S_0$, $S_1$, ... $S_{N-1}$, $S_N$}: vector representing correlation between GPS receive signal and local C/A code As shown in the exemplary embodiment of FIG. 4, the plurality of the SH circuits 433 (which includes at least a first SH $433_0$ and a second SH $433_1$), are asynchronously triggered such that each of the sample and hold circuits sample the received GPS signal portion at different times. Further particularly, the clock signals of the SH circuits are timed to aligned with the chip rate of the local C/A code chips.

Figure 5:
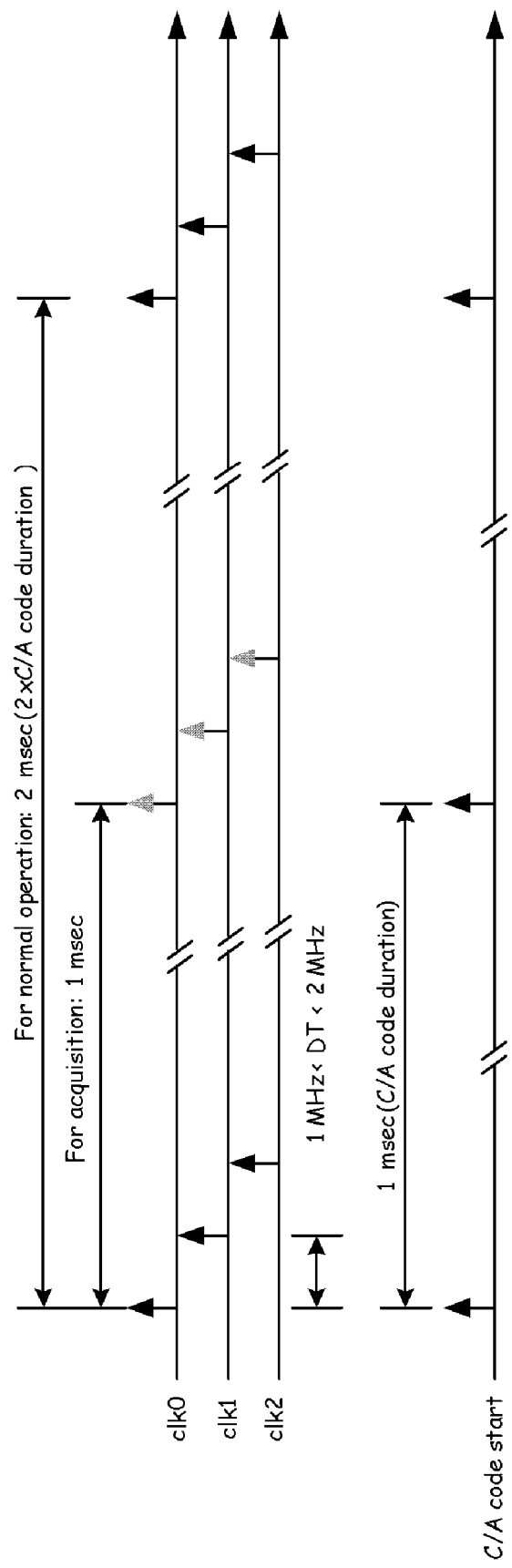
FIG. 5 illustrates a method for storing the received GPS signal portion using the GPS receiver system of FIG. 4 in accordance with the present invention.

FIG. 5 illustrates an exemplary timing diagram for clocking the sample and hold circuits in accordance with one embodiment of the invention. As can be taken from the diagram, the clock signals are offset by a period of 0.5-1 microsecond, corresponding to a rate of 1-2 MHz. Such a period and rate allows for the staggered clocking of the 1,023 sample and hold circuits $SH_0$-$SH_N$. Of course, when a different number of sample and hold circuits 433 are implemented, a different clock period/rate can be employed as well.

The correlation circuit of FIG. 4 uses an N length SH array 433, and the storage time of the received GPS signal portion may differ by a comparatively long time, e.g., 1 ms. As is known in the art, sample and hold circuits are imperfect storage devices and signals stored therein experience amplitude loss as a function of the parasitic resistance and capacitance:

$$Loss = e^{-t/RC}$$

where t is the storage time of signal, R is the equivalent leakage resistance and C is the equivalent leakage capacitance of the sample and hold circuit.

Due to the aforementioned leakage, and the difference in the storage time each SH circuit holds its respective GPS signal portion, signals stored in different SH circuits will experience difference discharge losses, possibly resulting in errors in the detection of correlation peaks. In order to compensate for such losses, the received GPS signal portion stored in the sample and hold circuits may be level adjusted as a function of the storage time.

Figure 6:
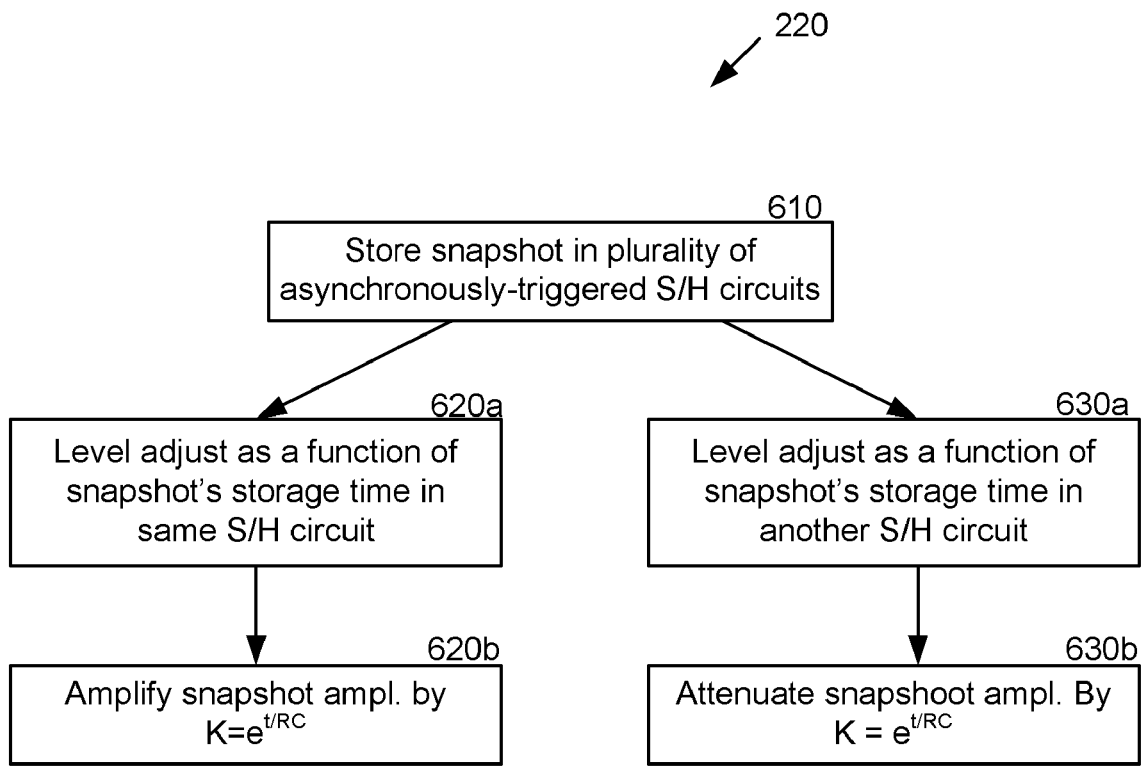
FIG. 6 illustrates methods for storing the received GPS signal portion using the GPS receiver system of FIG. 4 in accordance with one embodiment of the present invention.

FIG. 6 illustrates methods for storing the received GPS signal portion using the GPS receiver system of FIG. 4, whereby the aforementioned dissipation loss of the sample and hold circuit is compensated. The method includes storing the received GPS signal portion in a plurality of asynchronously-triggered sample and hold circuits as described above (operation 610). The process continues along either of one flows 620a,b or 630a,b. In flow 620, the received GPS signal portion is level adjusted as a function of the signal's storage time in the sample and hold circuit storing the signal (620a). Further particularly, the magnitude of the received GPS signal portion is amplified by the quantity K:

$$K = e^{t/RC}$$

where t is the storage time of received GPS signal portion stored in the sample and hold circuit, R is the equivalent leakage resistance and C is the equivalent leakage capacitance of the sample and hold circuit storing the received GPS signal portion. According to this method, each sample and hold circuit will apply a different amplification factor to its sample signal, as each sample and hold circuit samples and stores the received GPS signal portion at a different time. As a result, the sample signals output from respective sample and hold circuits will have substantially the same signal amplitude.

The operations described in flow 620 compensate sample and hold dissipation loss by amplifying a stored signal to the signal level of the latest sampled signal, thereby equalizing each of the sample and hold output signals to the magnitude of the latest sampled signal. Flow 630 represents an alternative approach, whereby the sample and hold output signals are equalized by attenuating the magnitude of the later-sampled signals to the level of the earliest sampled signal. In this approach, the level of the later sampled signal is level adjusted as a function of a sampled signal's storage time within another sample and hold circuit (operation 630a). In particular, the magnitude of the received GPS signal portion stored in a second (or "later triggered") sample and hold circuit $433_1$ is attenuated by an amount K:

$$K = e^{t/RC}$$

where t is the duration which the received GPS signal portion is held in the first (or "earlier triggered") sample and hold circuit $433_0$, R is the equivalent leakage resistance of the first sample and hold circuit $433_0$, and C is the equivalent leakage capacitance of the first sample and hold circuit $433_0$.

The skilled person will appreciate that the two aforementioned approaches 620 and 630 may also be combined, whereby a mid-point sample and hold circuit is used as a reference and signals output from earlier sample and hold circuits amplified to achieve the output signal level of the mid-point sample and hold circuit and the later sample and hold circuits attenuated to achieve the output signal level of the mid-point sample and hold circuit.

Figure 7A:
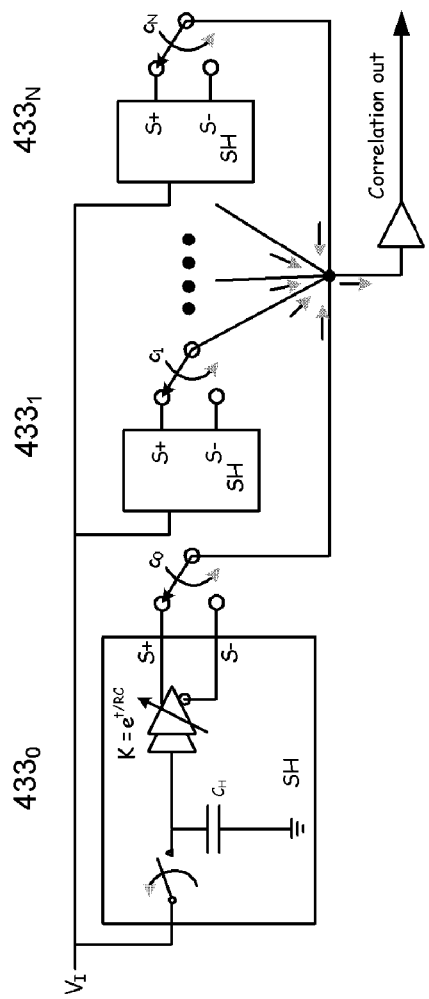
FIG. 7A illustrates an exemplary embodiment of the sample and hold circuits shown in FIG. 4 in accordance with one embodiment of the present invention.

FIG. 7A illustrates an exemplary embodiment of the sample and hold array 433 shown in FIG. 4 in accordance with one embodiment of the present invention. The SH circuits $433_0$-$433_N$ are shown in differential signal form, although a single-ended architecture may also be employed. For each SH circuit, a single-pole double-throw switch having a signal amplitude of a respective one of the local C/A code chips $c_0$-$c_N$ is alternated between differential signal outputs of the SH circuit, thereby generating an autocorrelated result of the stored signal and the local C/A code chip. The output of each SH circuit $433_0$-$433_N$ is summed at a node to provide a complete autocorrelation vector, and output to a peak detector (not shown).

Figure 7C:
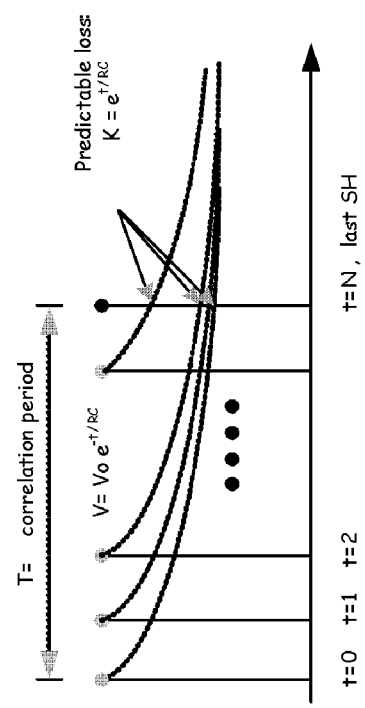
FIG. 7C illustrates the magnitude of the delay compensation applied to the sample and hold circuits in accordance with one embodiment of the present invention.
Figure 7B:
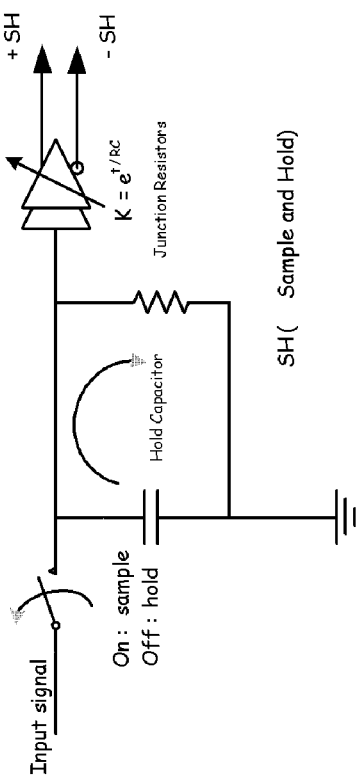
FIG. 7B illustrates an exemplary embodiment of a sample and hold circuit with delay compensation in accordance with one embodiment of the present invention.

FIG. 7B illustrates an exemplary detailed embodiment of sample and hold circuit with delay compensation in accordance with one embodiment of the present invention. The SH circuit $433_0$ includes an single-pole, single-throw switch used to sample the received GPS signal portion according to predefined clock timing, an example of which is described above. SH circuit $433_0$ includes an equivalent leakage capacitor and resistor. A differential amplifier is implemented to provide amplification to the stored signal in the amount $K = e^{t/RC}$, as described above.

FIG. 7C illustrates the magnitude of the delay compensation applied to the sample and hold circuits in accordance with one embodiment of the present invention. The graphic illustrates the amount of amplification needed to bring each of the earlier sampled signal portions (taken at t=0, t=1, t=2, etc.) to the level of the latest sample signal in SH $433_N$, each signal level being amplified by $K = e^{\Delta t/RC}$, where $\Delta t$ represents the time difference between the latest sample time and the sample time of the $i^{th}$ SH circuit, and R and C represents the equivalent leakage resistance and capacitance, respectively, of the $i^{th}$ SH circuit.

Figure 8:
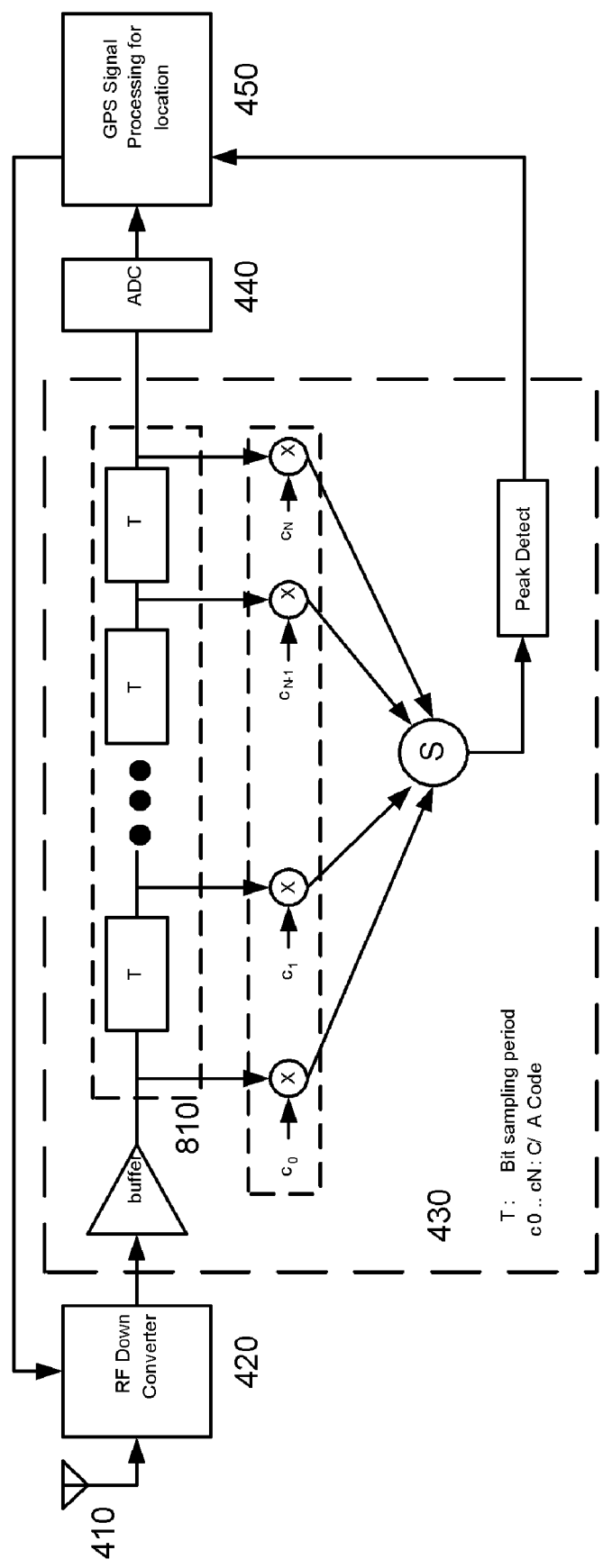
FIG. 8 illustrates a simplified block diagram of a GPS signal receiver employing a tapped delay line describing a method of decoding spread spectrum signal.

FIG. 8 illustrates a simplified block diagram of a GPS signal receiver employing a tapped delay line to decode spread spectrum signal. In this embodiment, the GPS receiver employs a tapped delay line to illustrate the decoding process for spread spectrum signal. Operation of the delay line equipped correlator 430 is substantially the same as described above in FIG. 4, wherein the received GPS signal portion is supplied in a staggered fashion to each of the correlators $433_0$-$433_N$, as delayed by respective sections of the delay line 810. However, this method is impractical and only useful for theoretical illustration purpose for it is extremely difficult to control the precise delay tap to match the code clock period.

Figure 9:
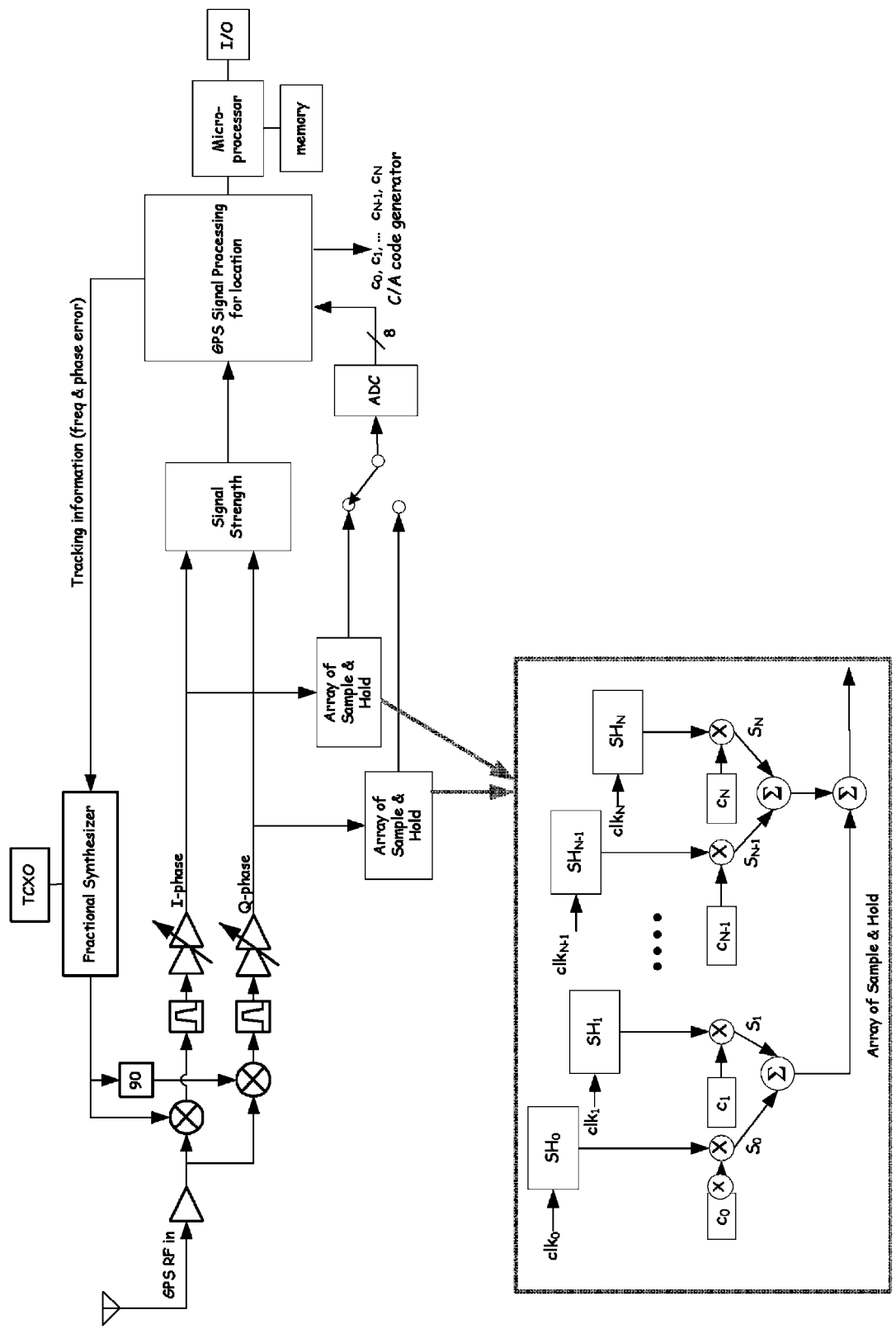
FIG. 9 illustrates an exemplary multi-channel GPS receiver in accordance with one embodiment of the present invention.

FIG. 9 illustrates an exemplary multi-channel GPS receiver in accordance with one embodiment of the present invention. In this embodiment, the GPS receiver employs the analog correlators for in-phase channel (I-channel) and quadri-phase channel (Q-channel) to accommodate the frequency offset caused by either Doppler shift by fast moving satellite and/or local oscillator frequency deviation. The correlation peak(s) found in I-channel and the correlation peak(s) found in Q-channel at the same time instance are used to compute the phase angle. The frequency deviation is derived by measuring amount of angle rotation during a fixed period.

Figure 10:
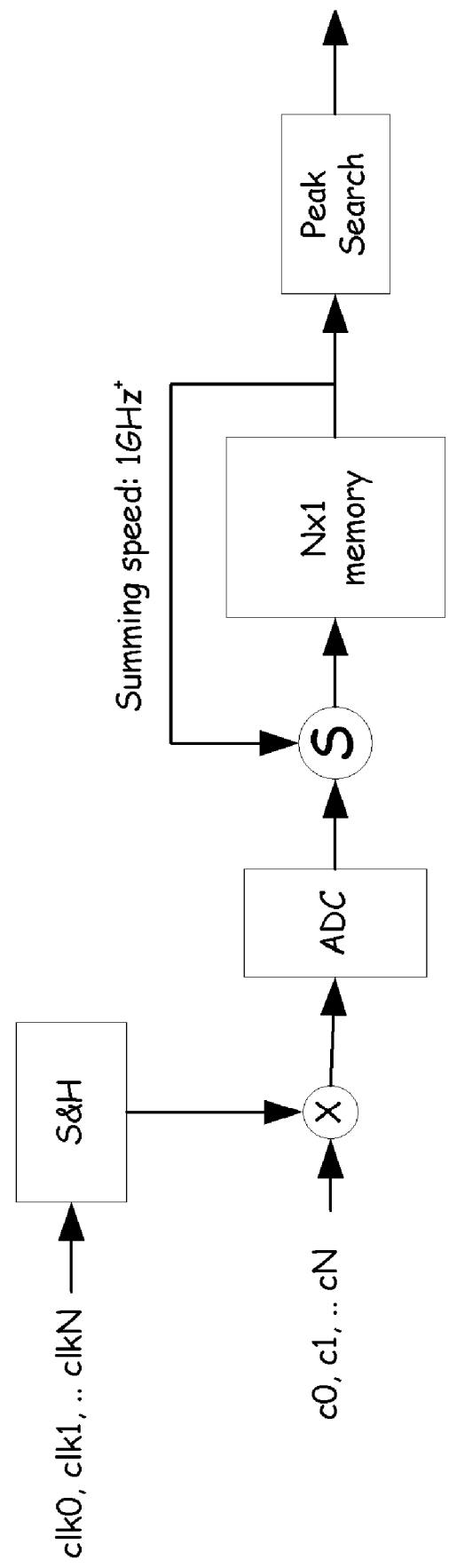
FIGS. 10-12 illustrate exemplary correlator architectures in accordance with the present invention.
Figure 11:
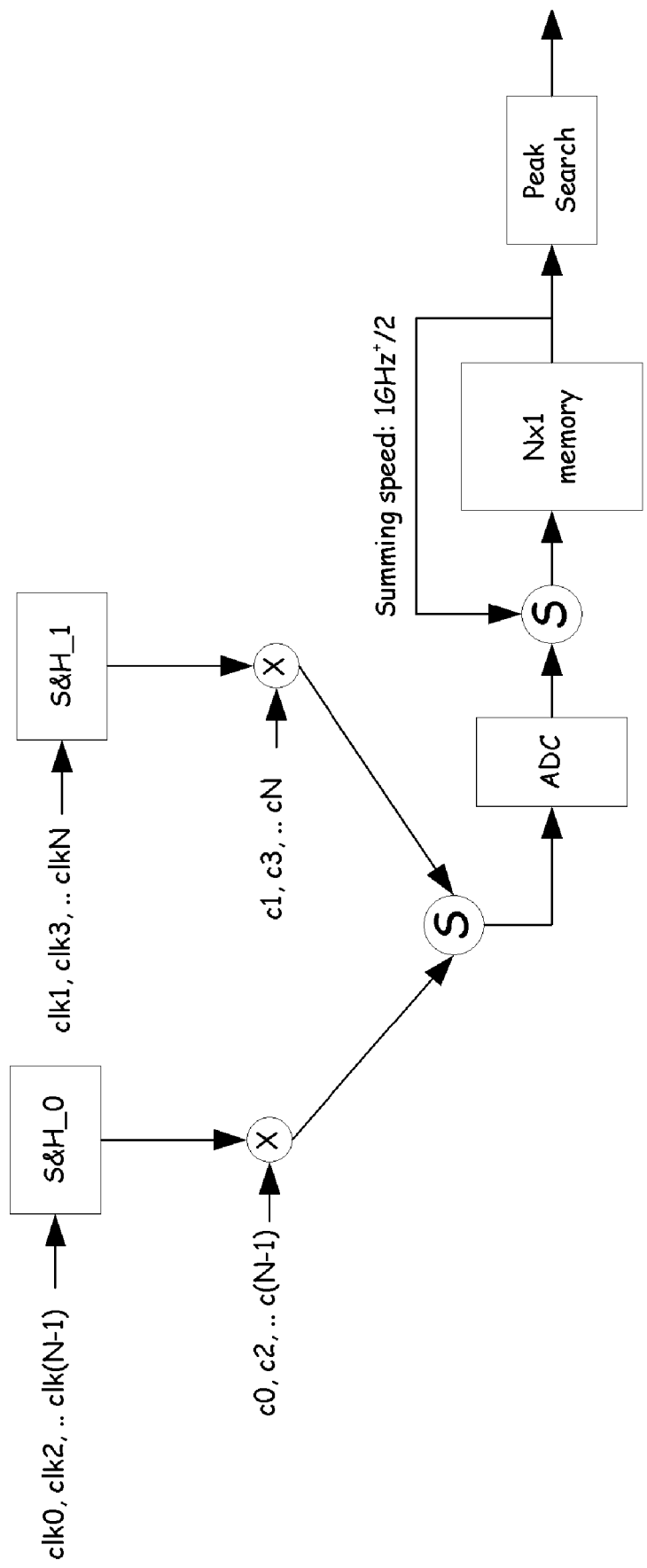
Figure 12:
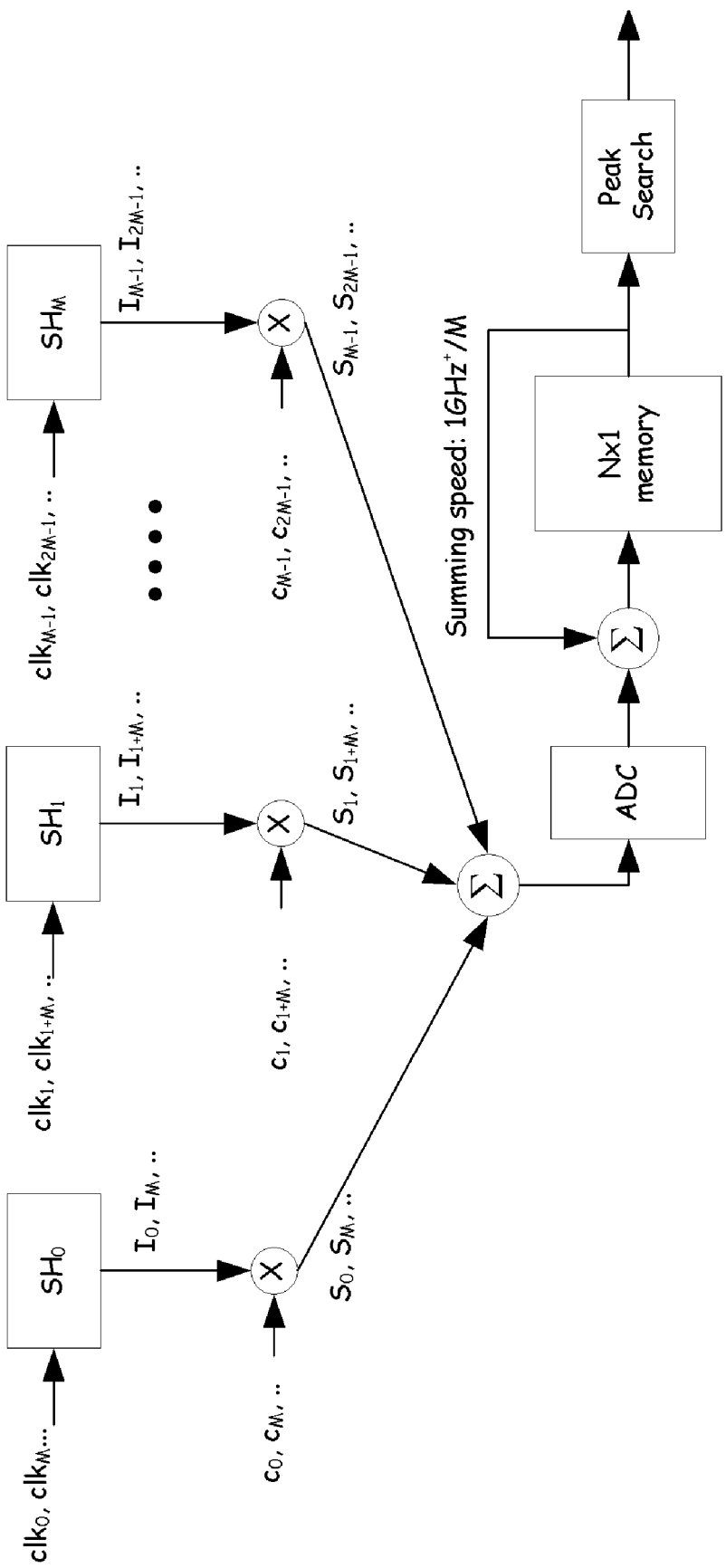

FIGS. 10-12 illustrate exemplary correlator architectures in accordance with the present invention. FIG. 10 uses only one SH (Sample and Hold) is used and is most simple analog design, but requires the correlation clock rate to reach more than a 1 GHz. FIG. 11 uses two SH circuits and FIG. 12 uses M sample and hold circuits.

Regarding the correlator architecture shown in FIG. 12, the outputs of SH are correlated with M width of the local C/A code and the correlation result is store in the RAM;

$SH(clk_n) = I_n$: Output of $SH_n$ which is sampled at $clk_n$ $RAM_n$: RAM location where partial correlation of the $n^{th}$ code set is stored $T_n$: $n^{th}$ sample time $$I_0 * \{c_0, c_1, \ldots c_N\} \rightarrow \{RAM_0, RAM_1, \ldots RAM_N\}$$
$$\{RAM_0, RAM_1, \ldots RAM_N\} + I_1 * \{c_1, c_2, \ldots c_N, c_0\} \rightarrow \{RAM_0, RAM_1, \ldots RAM_N\}$$
$$\{RAM_0, RAM_1, \ldots RAM_N\} + I_2 * \{c_2, c_3, \ldots c_0, c_1\} \rightarrow \{RAM_0, RAM_1, \ldots RAM_N\}$$
$$\vdots$$

Figure 13:
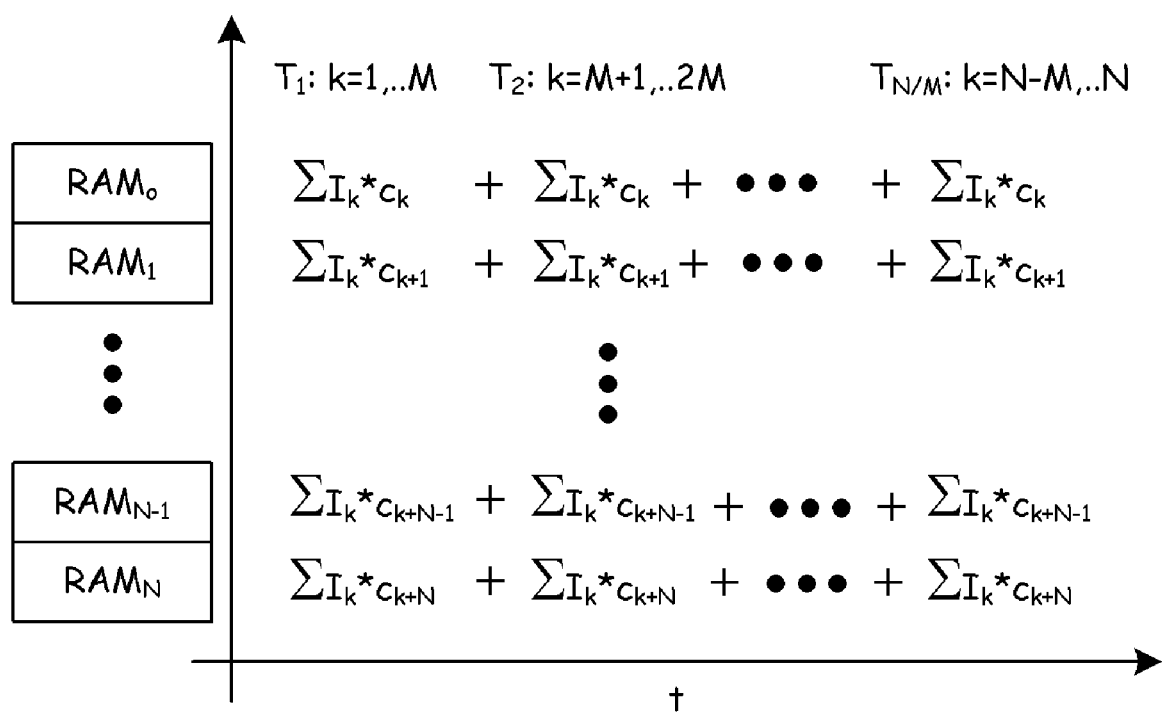
FIG. 13 shows the operation and the contents of RAM in respect to local clock t for the correlator architecture shown in FIG. 12 in accordance with the invention.

FIG. 13 shows the operation and the contents of RAM in respect to local clock t for the correlator architecture shown in FIG. 12 in accordance with the invention. For the first T*M duration, $SH_0$ samples the received GPS signal using $clk_0$ and $SH_1$ samples at $clk_1$ until all $SH_m$ is samples against $clk_m$. $I_k$ is defined to be sampled GPS signal using $clk_k$. Each sampled signal $I_k$ then multiplied with $c_k$ for k=0 . . . M. The result of $I_k c_k$ is summed for all $I_k$ for k=0 . . . M and stored in the $RAM_0$. The summation, $I_k c_k$ for k=0 . . . M is called a partial correlation for length M. Immediately after this operation $c_k$ is delayed by one sample clock and is correlated to $I_k$. Again the result of $I_k c_{k+1}$ is summed for all $I_k$ for k=0 . . . M is stored in $RAM_1$. This operation continues until $RAM_N$ is all updated with the partial correlated value.

In a particular embodiment of the invention, this operation completes all 1023 operation before the new SH begins. There are many ways to do this; one method is skipping every other correlation duration and another method is the ping-pong scheme.

Repeating the above step for N/M times provides a full frame correlation view of the received signal against the local C/A code. The advantage of this circuit is practical design and implementation of the analog circuits. To hold the value longer a larger capacitor is used for SH (Sample and Hold). It is also noted that lower the number of SH, higher the digital clock rate is for the parallel correlation. Since the power consumption is proportional to the clock rate, the lower the number of SH the higher the power consumption. For example, a single SH design requires the digital correlator to run at a speed higher than 1 GHz for the full length C/A code correlation. And M wide SH design reduces the speed of the digital correlator by 1/M. A preferred value for M may be selected between 20 to 100 that enables the digital correlator to run less than 50 MHz.

Operation with Impairment

The frequency tuning and clock adjustment is preferably made to acquire the received GPS signal in the presence of impairments. The typical impairments are noise, multipath, Doppler, and the local crystal offset.

The thermal noise for the signals from the satellite is Gaussian in nature. Multipath is caused from the reflection of nearby building façades, structures or mountains, and it can be a major source of errors in location calculation. A poor quality local crystal for the GPS receiver and Doppler shift causes the frequency offset from the GPS signal. This frequency offset is preferably removed prior to acquiring the GPS signal. Since GPS carrier is synchronized with GPS bit clock, acquiring a carrier frequency results in immediate acquisition of the bit clock.

The carrier frequency acquisition can be expedited if the accuracy of the local crystal is known. As an example, for crystal with +2 ppm accuracy and temperature compensated, the frequency offset can be as much as 3 KHz as shown below.

$$1.575 \times 10^9 (L1) * 2 \times 10^{-6} \text{ (or 2 ppm)} = 3.15 \text{ KHz}$$

This means 3.15 cycles per one C/A code frame (1 millisecond) in the worst case. In addition Doppler shift can further deviate the carrier another 2.5 KHz. If correlation is performed for 1 millisecond without correcting the carrier offset, the result will be erased from the vector rotation.

For meaningful measurement, the correlation length is preferably less than ¼ cycle of the carrier offset:

$$\text{Correlation Length } L = \frac{1}{4} \times N/(f_{carrier\_offset}/\text{code\_cycle})$$

where code_cycle=1 KHz which is frequency of C/A code repetition. Thus, for the above example where 2 ppm local crystal oscillator was used, the code length is preferably less than:

$$\frac{1}{4} \times 1023/5.65 \sim 45$$

The Eb/No loss is 13.5 dB where a frame length correlation gives 30 dB Eb/No gain. This greatly reduces the receiver sensitivity. For 1 ppm crystal oscillator the potential loss of Eb/No is 10 dB.

Coarse C/A Code & Carrier Acquisitions:

A set of analog samples for GPS signal is taken for L length for I-phase and Q-phase and held by $SH_n$ blocks as shown in FIG. 4. The summation of vector $\{S_0, \ldots S_{L-1}\}_{I-phase}$ is defined to be I and the summation of vector $\{S_0, \ldots S_{L-1}\}_{Q-phase}$ to be Q.

The partial peak is searched by adding the absolute value of I and the absolute value of Q vectors. After the peak is found, the phase angle is calculated by:

$$\phi_{err} = \text{Arctan}(Q/I)$$

This task is repeated for the same duration. The output is recorded and then the second measurement is made by repeating the above step.

The following equation shows the computation of the carrier frequency offset from GPS satellites:

$$f_{offset} = [\text{Arctan}(Q_1/I_1) - \text{Arctan}(Q_2/I_2)]/2\pi\Delta T_{code} \quad \text{or}$$
$$f_{offset} = (\phi_{err1} - \phi_{err2})/2\pi\Delta T_{code}, \text{ where}$$
$$\Delta T_{code} = \text{correlation duration}$$

For AFC (Automatic Frequency Correction) the $f_{offset}$ error is sent to digital loop filter which then computes the correction amount and sends it to Fractional Synthesizer.

This rough code and carrier acquisition repeats on every C/A code frame or fraction of the frame until the carrier frequency offset is near zero. After the acquisition, coarse and fine acquisition starts immediately.

Coarse Code Acquisition

Figure 14:
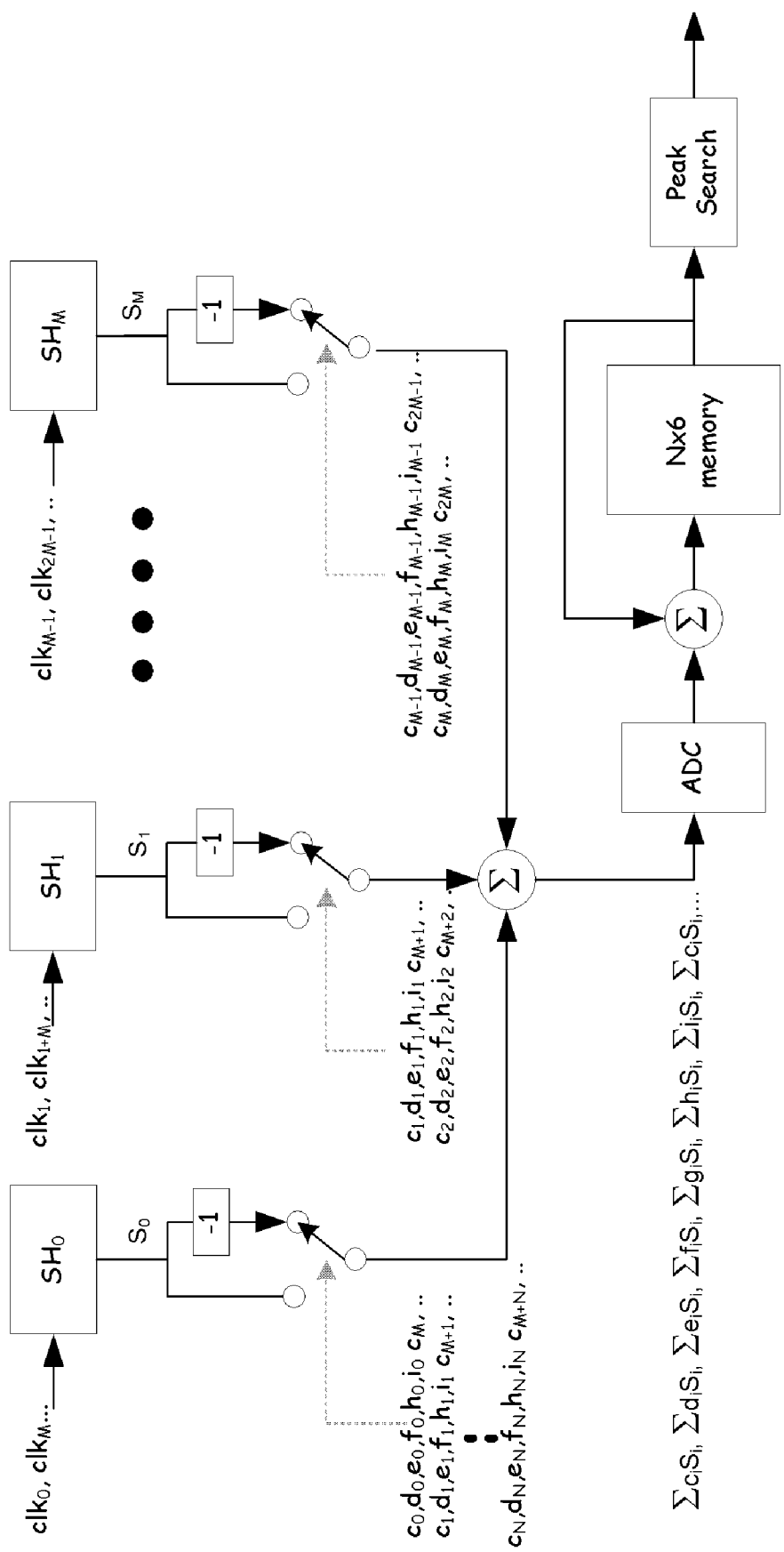
FIG. 14 illustrates the graphical presentation of acquiring 6 satellites simultaneously using M-width analog correlator in accordance with the invention.

FIG. 14 illustrates the graphical presentation of acquiring 6 satellites simultaneously using M-width analog correlator in accordance with the invention. The local C/A codes $\{c_k, d_k, e_k, f_k, g_k, h_k, i_k\}$ for k=0 . . . N represents family of gold code that is unique to each satellite.

For each GPS sample, the following operation is performed:

For k=1 . . . M $$Rsc(t)=\Sigma S_k * c_k; Rsc(t-T)=\Sigma S_k * c_{k+1}; \ldots; Rsc(t-NT)= \Sigma S_k * c_{k+N}$$

$$Rsd(t)=\Sigma S_k * d_k; Rsd(t-T)=\Sigma S_k * d_{k+1}; \ldots; Rsd(t-NT)= \Sigma S_k * d_{k+N}$$

$$Rse(t)=\Sigma S_k * e_k; Rse(t-T)=\Sigma S_k * e_{k+1}; \ldots; Rse(t-NT)= \Sigma S_k * e_{k+N}$$

$$Rsf(t)=\Sigma S_k * f_k; Rsf(t-T)=\Sigma S_k * f_{k+1}; \ldots; Rsf(t-NT)= \Sigma S_k * f_{k+N}$$

$$Rsg(t)=\Sigma S_k * g_k; Rsg(t-T)=\Sigma S_k * g_{k+1}; \ldots; Rsg(t-NT)= \Sigma S_k * g_{k+N}$$

$$Rsh(t)=\Sigma S_k * h_k; Rsh(t-T)=\Sigma S_k * h_{k+1}; \ldots; Rsh(t-NT)= \Sigma S_k * h_{k+N}$$

where $S_k$ is $k^{th}$ sample and Rsc, Rsd, Rse, Rsf, Rsg, and Rsh are the partial correlation results of the local C/A codes against the receive GPS signal. Therefore, the total of 6*M operation are preferably performed within one correlation period before the SH takes new sample.

Figure 15:
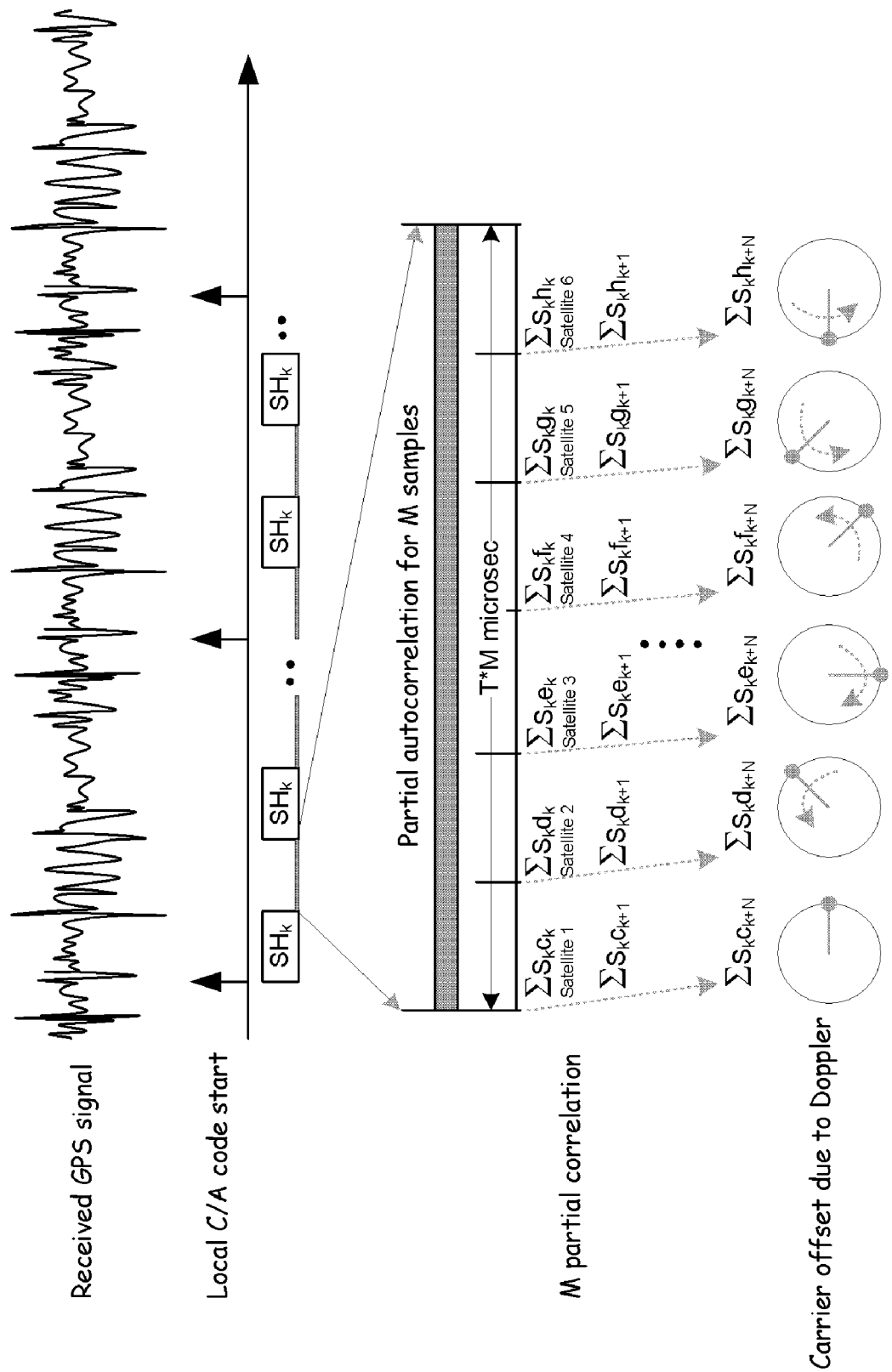
FIG. 15 shows a method of doubling the correlation period with a dedicated blank time for the 6 satellite system shown in FIG. 14 in accordance with the present invention.

FIG. 15 shows a method of doubling the correlation period with a dedicated blank time for the 6 satellite system shown in FIG. 14 in accordance with the present invention. This method greatly reduces the speed requirement of the analog correlator.

The first correlation result, Rsc is frequency locked such that AFC adjusted even for the carrier offset caused by Doppler. For other 5 satellites the correlation results rotate at a rate of the frequency offset caused by Doppler shift. The Doppler frequency offset is preferably corrected before it is sent to the summing RAM.

The frequency offset caused by Doppler can be measured using the immediately previous equation for all other 5 satellites during carrier acquisition.

The Doppler shift is removed by multiplying the correlated results with the estimated frequency shift;

$$Rsd_{I-phase} = Rsd_{I-phase} * \cos(\omega_d t), \quad Rsd_{Q-phase} = Rsd_{Q-phase} * \sin(\omega_d t)$$

$$Rse_{I\text{-}phase} = Rse_{I\text{-}phase} * \cos(\omega_e t),\qquad Rse_{Q\text{-}phase} = Rse_{Q\text{-}phase} * \sin(\omega_e t)$$

$$Rsf_{I\text{-}phase} = Rsf_{I\text{-}phase} * \cos(\omega_f t),\qquad Rsf_{Q\text{-}phase} = Rsf_{Q\text{-}phase} * \sin(\omega_f t)$$

$$Rsg_{I\text{-}phase} = Rsg_{I\text{-}phase} * \cos(\omega_g t),\qquad Rsg_{Q\text{-}phase} = Rsg_{Q\text{-}phase} * \sin(\omega_g t)$$

$$Rsh_{I\text{-}phase} = Rsh_{I\text{-}phase} * \cos(\omega_h t),\qquad Rsh_{Q\text{-}phase} = Rsh_{Q\text{-}phase} * \sin(\omega_h t)$$

where $\omega_d$, $\omega_e$, $\omega_f$, $\omega_g$, $\omega_h$ are the Doppler frequency offset for satellite D,E,F,G and H respectively. As shown in FIG. 13, the partial I (In-phase) and Q (Quadri-phase) correlation results are added in the memory until the last correlation results are added.

Figure 16:
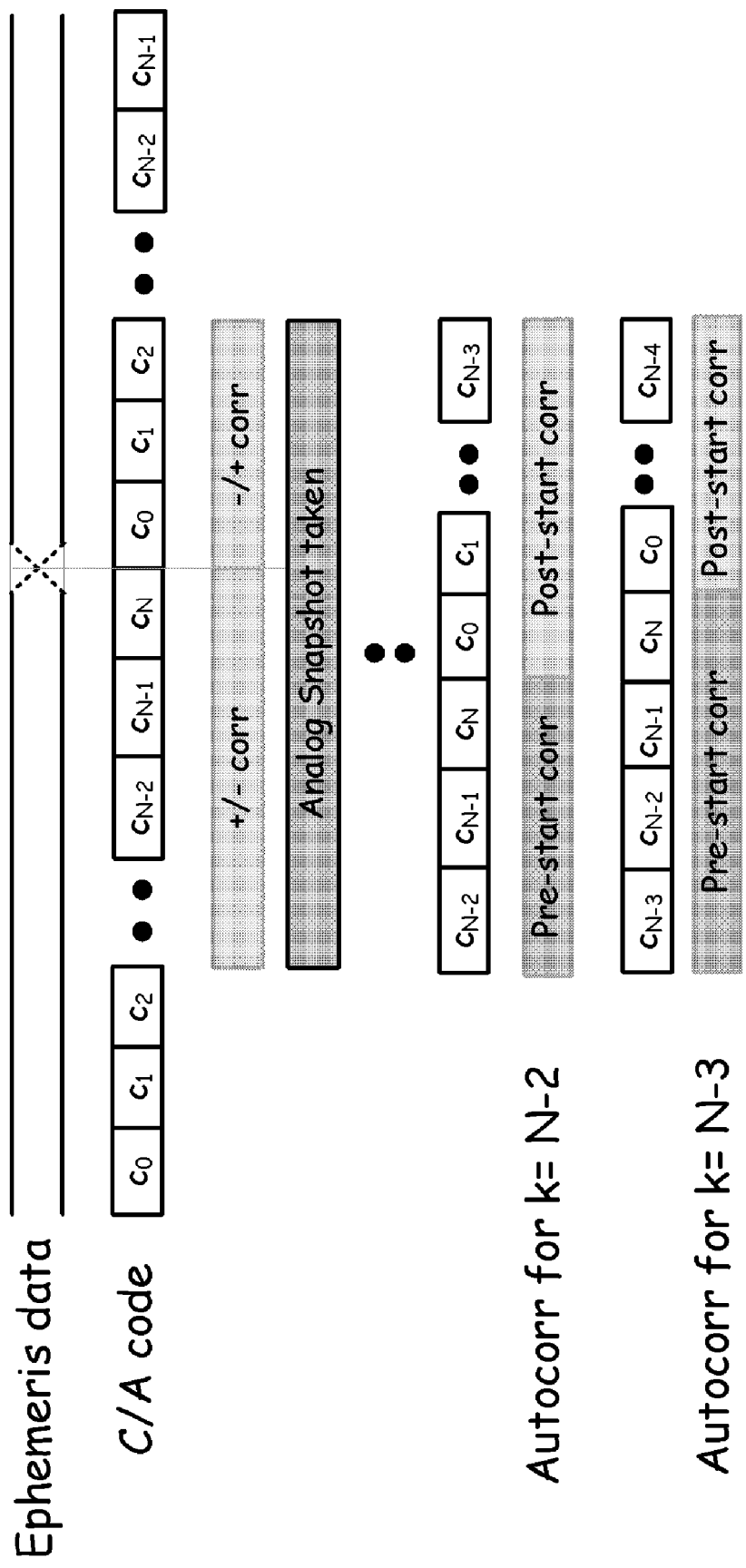
FIG. 16 illustrates the condition in which ephemeris data transition is super-imposed over the C/A code when the correlation period is extended.

An added difficulty by extending the correlation period is the ephemeris data transition that is super-imposed over the C/A code as shown on FIG. 16. If a snapshot is taken during the data transition, then the proper sign treatment is preferably made to avoid the correlation cancellation.

To mitigate such ambiguity, the correlation is performed and stored in two separate memory locations. One correlation result is prior to the local starting C/A code (pre-starting correlation) and the other correlates after the local starting C/A code (post-starting correlation). Each result is stored in the separate RAM. The final correlation value is computed by taking absolute value of In-phase and Quadri-phase correlation results:

$$Rsc = [ABS(Rsc_{I\text{-}phase}) + ABS(Rsc_{Q\text{-}phase})]_{pre} + [ABS(Rsc_{I\text{-}phase}) + ABS(Rsc_{Q\text{-}phase})]_{post}$$

$$Rsd = [ABS(Rsd_{I\text{-}phase}) + ABS(Rsd_{Q\text{-}phase})]_{pre} + [ABS(Rsd_{I\text{-}phase}) + ABS(Rsd_{Q\text{-}phase})]_{post}$$

$$Rse = [ABS(Rse_{I\text{-}phase}) + ABS(Rse_{Q\text{-}phase})]_{pre} + [ABS(Rse_{I\text{-}phase}) + ABS(Rse_{Q\text{-}phase})]_{post}$$

$$Rsf = [ABS(Rsf_{I\text{-}phase}) + ABS(Rsf_{Q\text{-}phase})]_{pre} + [ABS(Rsf_{I\text{-}phase}) + ABS(Rsf_{Q\text{-}phase})]_{post}$$

$$Rsg = [ABS(Rsg_{I\text{-}phase}) + ABS(Rsg_{Q\text{-}phase})]_{pre} + [ABS(Rsg_{I\text{-}phase}) + ABS(Rsg_{Q\text{-}phase})]_{post}$$

$$Rsh = [ABS(Rsh_{I\text{-}phase}) + ABS(Rsh_{Q\text{-}phase})]_{pre} + [ABS(Rsh_{I\text{-}phase}) + ABS(Rsh_{Q\text{-}phase})]_{post}$$

Signs of the pre- and the post-correlation are removed by taking the absolute value and summed as a final correlation result. The total memory size requirement for 6 channel operation is 6 (channel)*2 (I/Q)*2 (pre/post)*1023 (C/A code)×8 (bit width) or 24,552×8 RAM block. After the completion of the operation, the contents of correlation RAM are compared to find the code match which is signified by exceeding a correlation threshold. Also the RAM location for the peak indicates the delay among satellites respect to each other, which is important in calculating the geo-location.

The findings of the correlation peak can have an accuracy of 500 nsec (or ½ chip) if the sampling rate is Nyquist rate. This implies that the potential error can be 150 meters for calculating the geo-location. This crude measurement is less helpful for navigation purposes. Thus, a fine code acquisition is preferably performed to get the code to be aligned within 1% of error or 3 meter geo-location error.

Fine Code Acquisition

Slight time miss-alignment between the GPS signal to local C/A code causes an immediate error in calculating the geo-location. For instance 10 nanosecond alignment offset (1% of C/A code bit) is equivalent to 3 meter error in computing the geo-location.

Figure 17:
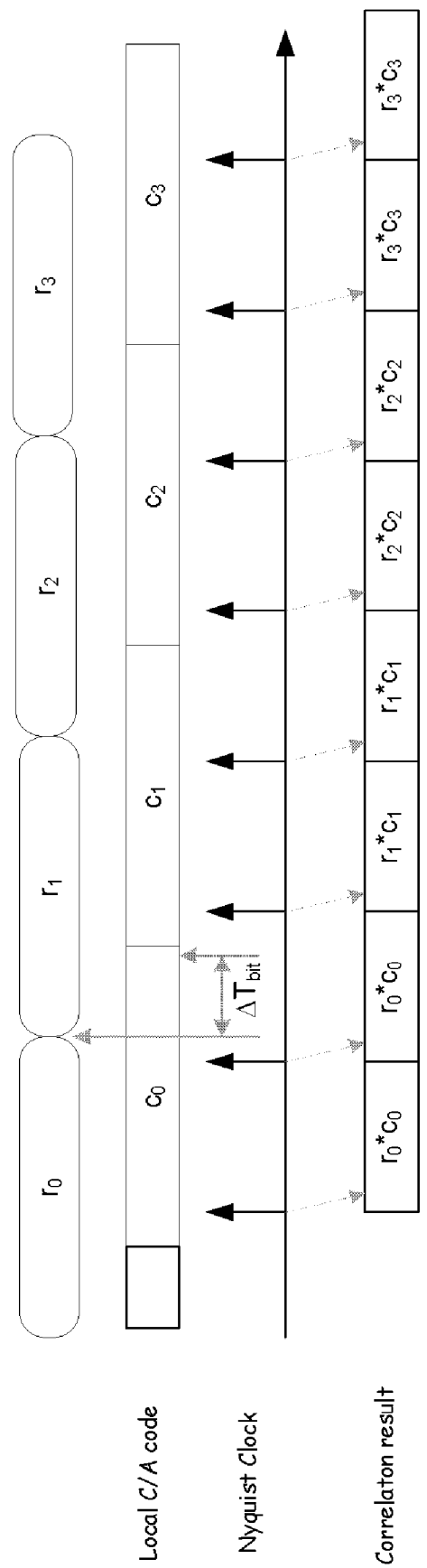
FIG. 17 illustrates the condition in which a digital correlator cannot detect the offset between the received GPS signal and the local C/A code.

FIG. 17 illustrates the condition in which a digital correlator cannot detect the offset between the received GPS signal and the local C/A code. In this instance, even using a Nyquist sample clock the digital correlator sees the perfect match and cannot detect the offset between the receive GPS signal and the local C/A code. The ATbit directly translates to error in calculating the location.

To detect and minimize such error, a fine acquisition is preferably performed for ATbit to be aligned in less than 10 nanoseconds or 1% of C/A code bit duration (1 microsecond). The simple and brute force way of achieving the finer resolution is by over sampling. 50 times the Nyquist rate oversampling (or 100 MHz sampling rate) will give the results at 1% accuracy. This brute force method will give the desired result, but at very high cost and excessive power consumption. Therefore it is not a feasible option for battery operation.

Figure 18:
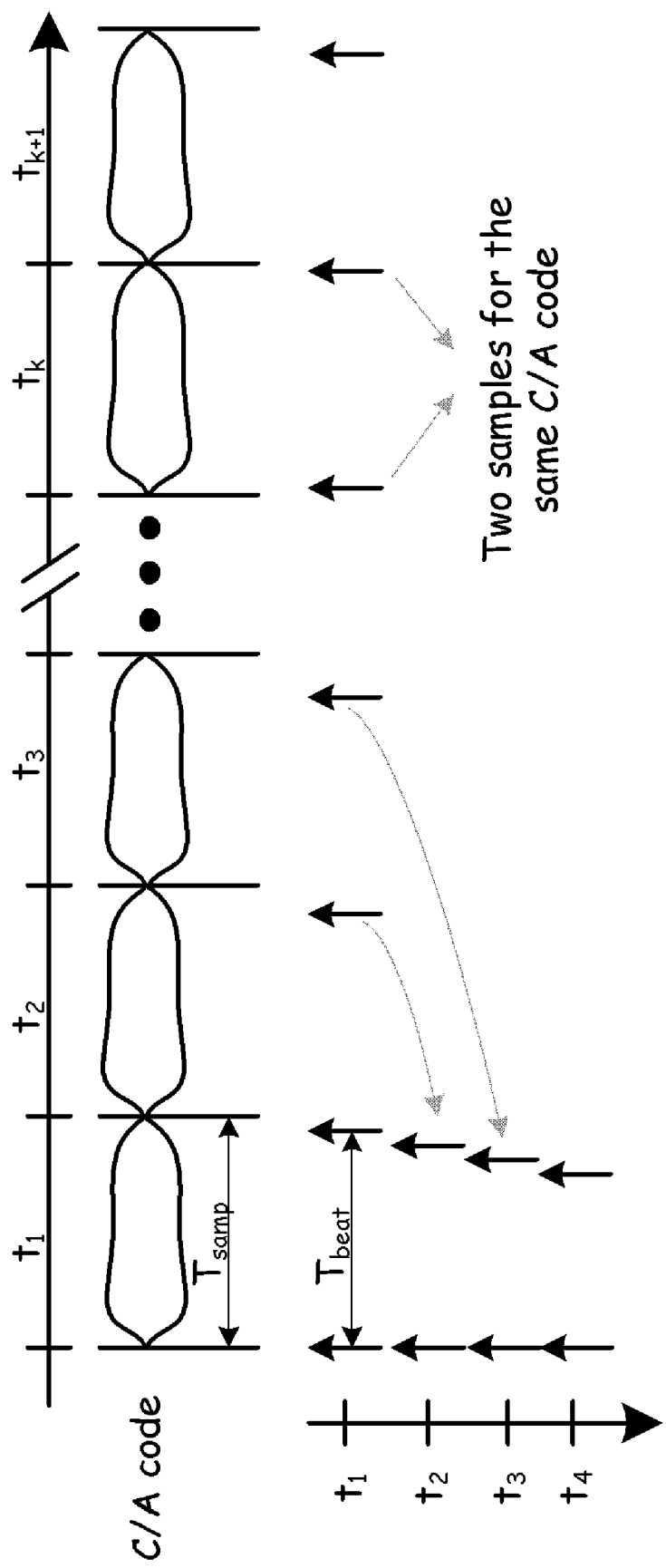
FIG. 18 shows an exemplary method of fine acquisition using a beat clock in accordance with the present invention.

FIG. 18 shows an exemplary method of fine acquisition using a beat clock in accordance with the present invention. A beat clock with the period $T_{beat}$ which is less than $T_{samp}$ is used to sample the incoming GPS signal against the local C/A code. The figure shows that how the beat clock sweeps the incoming signal over several chip periods. If $T_{beat}$ is 98% of $T_{samp}$, the beat clock sweeps the receive GPS signal at a step of 2% per C/A code chip. This sweeping method is used to detect the C/A code bit transition.

Figure 19:
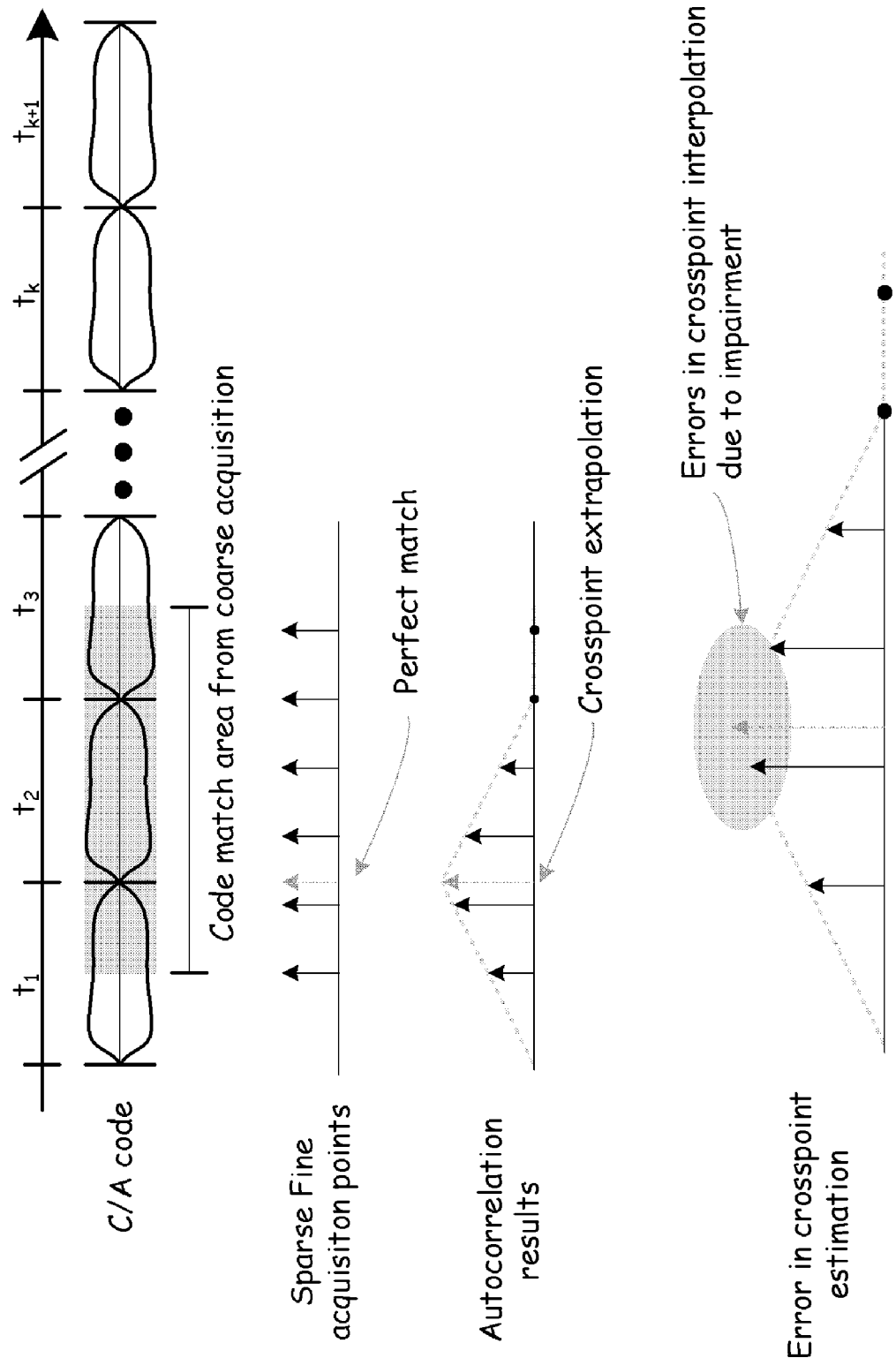
FIG. 19 illustrates a second exemplary method for fine acquisition using a coarse beat clock in accordance with the present invention.

Another method is sweeping using a coarse beat clock such as $T_{beat}$ is 90% of $T_{samp}$, and the peak is estimated by interpolation as shown on FIG. 19. The accuracy of cross point estimation is highly dependent upon the impairments such as noise or multipaths. Several measurements are made and averaged for better results.

Figure 20:
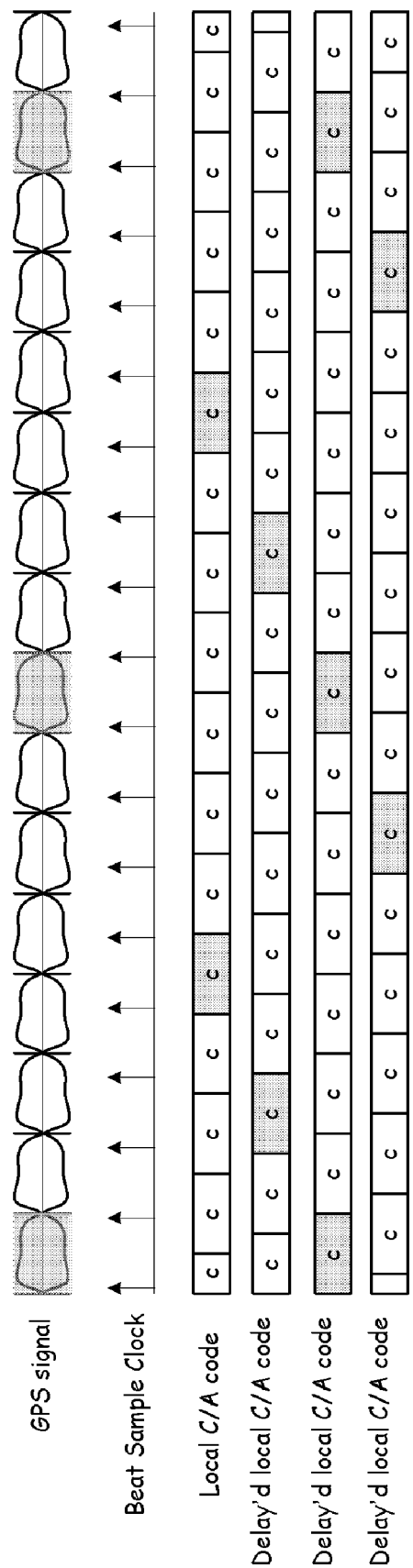
FIG. 20 illustrates an exemplary technique for aligning the local C/A code without physically aligning the local C/A code with a higher clock in accordance with the present invention.

FIG. 20 illustrates an exemplary technique for aligning the local C/A code without physically aligning the local C/A code with a higher clock in accordance with the present invention. The shaded area shows where the beat sample clock double samples the same code twice. The graph is represented using 25% resolution beat clock step as an example. The double clock samples are the location where all other delayed C/A codes will differ from the correctly aligned C/A code. The estimate correlation difference is going to be less than 14% from the correct one and the one next. A finer sweeping step can be done but the correlation peak slope may be too gradual for a reasonably good interpolation. For all other satellites the exact same operation is performed with the Doppler shift correction.

Figure 21:
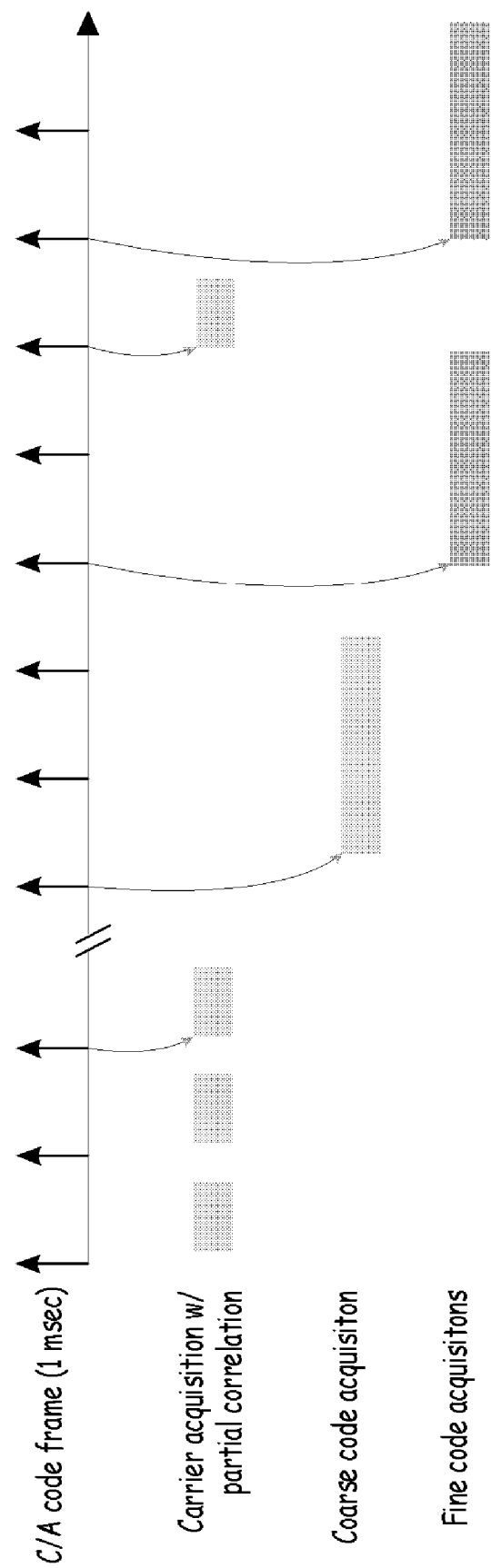
FIG. 21 shows an exemplary time sequence for acquiring GPS signal in accordance with the present invention.

FIG. 21 shows an exemplary time sequence for acquiring GPS signal in accordance with the present invention. At the power up carrier acquisition is performed, and then a coarse acquisition. Fine acquisition can be taken many times proceeded by carrier acquisition. The measurements are averaged to get a precise geo-location result.

In summary the advantage of this new method is from the advanced analog signal processing and two commercially available resources; the first is the advanced analog CMOS process and the second is the availability of low cost and temperature compensated crystal. These new resources enable the real-time GPS acquisition using the time-bounded snapshot very efficiently.

As readily appreciated by those skilled in the art, the described processes may be implemented in hardware, software, firmware or a combination of these implementations as appropriate. In addition, some or all of the described processes may be implemented as computer readable instruction code resident on a computer readable medium, the instruction code operable to program a computer of other such programmable device to carry out the intended functions. The computer readable medium on which the instruction code resides may take various forms, for example, a removable disk, volatile or non-volatile memory, etc., or a carrier signal which has been impressed with a modulating signal, the modulating signal corresponding to instructions for carrying out the described operations.

The terms "a" or "an" are used to refer to one, or more than one feature described thereby. Furthermore, the term "coupled" or "connected" refers to features which are in communication with each other (electrically, mechanically, thermally, as the case may be), either directly, or via one or more intervening structures or substances. The sequence of operations and actions referred to in method flowcharts are exemplary, and the operations and actions may be conducted in a different sequence, as well as two or more of the operations and actions conducted concurrently. All publications, patents, and other documents referred to herein are incorporated by reference in their entirety. To the extent of any inconsistent usage between any such incorporated document and this document, usage in this document shall control.

The foregoing exemplary embodiments of the invention have been described in sufficient detail to enable one skilled in the art to practice the invention, and it is to be understood that the embodiments may be combined. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined solely by the claims appended hereto.

What is claimed is:

1. A method for acquiring a GPS signal having a predefined coarse acquisition frame period, the method comprising:
   receiving a GPS signal portion over the coarse acquisition (C/A) frame period;
   storing the received GPS signal portion;
   correlating the received GPS signal portion to each of a plurality of versions of a reference coarse acquisition (C/A) code to obtain a respective plurality of autocorrelation values; and
   selecting a peak value among the autocorrelation values, wherein correlating the received GPS signal portion comprises:
      (i) correlating the received GPS signal portion to a reference coarse acquisition code to obtain a first autocorrelation value;
      (ii) circularly-shifting the reference coarse acquisition code to obtain a shifted reference coarse acquisition code;
      (iii) correlating the received GPS signal portion to the circularly-shifted reference coarse acquisition code to obtain a second autocorrelation value and
      repeating (ii) and (iii) until the reference C/A code has shifted through one complete revolution, whereby the received GPS signal portion is correlated to each of the reference and shifted versions of the C/A code.

2. The method of claim 1, wherein storing comprises storing the received GPS signal portion within each of at least first and second sample and hold circuits, the first and second sample and hold circuits triggered to sample the received GPS signal portion at different respective times.

3. The method of claim 1, wherein selecting a peak value comprises:
   comparing the magnitude of the first and second autocorrelation values; and
   selecting the larger of the first or second autocorrelation values.

4. The method of claim 1, wherein the collective period over which the received GPS signal is correlated to each of the reference and shifted versions of the C/A code is less than or equal to the C/A frame period.

5. The method of claim 2, further comprising level adjusting the received GPS signal stored in at least one of the first or second sample and hold circuits.

6. The method of claim 5, whereby the magnitude of the received GPS signal portion stored in the first sample and hold circuit is adjusted as a function of the time the received GPS signal portion is stored therein.

7. The method of claim 6, wherein level adjusting comprises amplifying the magnitude of the received GPS signal portion stored in the first sample and hold circuit by an amount K:

$$K=e^{t/RC}$$

where t is the duration the received GPS signal portion is held in the first sample and hold circuit, R is the equivalent leakage resistance of the first sample and hold circuit, and C is the equivalent leakage capacitance of the first sample and hold circuit.

8. The method of claim 5, wherein the magnitude of the received GPS signal portion stored in the second sample and hold circuit is adjusted as a function of the received GPS signal portion's storage time within the first sample and hold circuit.

9. The method of claim 8, wherein level adjusting comprises attenuating the magnitude of the received GPS signal portion stored in the second sample and hold circuit by an amount K:

$$K=e^{t/RC}$$

where t is the duration the received GPS signal portion is held in the first sample and hold circuit, R is the equivalent leakage resistance of the first sample and hold circuit, and C is the equivalent leakage capacitance of the first sample and hold circuit.

10. A system for acquiring a GPS signal having a predefined coarse acquisition frame period, the system comprising:
   receiver circuitry configured to receive a GPS signal portion over the coarse acquisition (C/A) frame period;
   circuitry configured to store the received GPS signal portion;
   a correlator configured to correlate the received GPS signal portion to each of a plurality of versions of a reference coarse acquisition (C/A) code to obtain a respective plurality of autocorrelation values; and
   a comparator configured to select a peak value among the autocorrelation values,
   wherein the correlator comprises:
      (i) means for correlating the received GPS signal portion to a reference coarse acquisition code (2201) to obtain a first autocorrelation value;
      (ii) means for circularly-shifting the reference coarse acquisition code to obtain a shifted reference coarse acquisition code;
      (iii) means for correlating the received GPS signal portion to the circularly-shifted reference coarse acquisition code to obtain a second autocorrelation value and means for repeating (ii) and (iii) until the reference C/A code has shifted through one complete revolution, whereby the received GPS signal portion is correlated to each of the reference and shifted versions of the C/A code.

11. The system of claim 10, wherein the circuitry configured to store comprises at least first and second sample and hold circuits, the first and second sample and hold circuits triggered to sample the received GPS signal portion at different respective times.

12. The system of claim 11, further comprising a level controller configured to adjust the magnitude of a sample signal stored in at least one of the first or second sample and hold circuits.

13. The system of claim 12, whereby the magnitude of the received GPS signal portion stored in the first sample and hold circuit is adjusted as a function of the time the received GPS signal portion is stored therein.

14. The system of claim 13, wherein level adjusting comprises amplifying the magnitude of the received GPS signal portion stored in the first sample and hold circuit by an amount K:

$$K = e^{t/RC}$$

where t is the duration the received GPS signal portion is held in the first sample and hold circuit, R is the equivalent leakage resistance of the first sample and hold circuit, and C is the equivalent leakage capacitance of the first sample and hold circuit.

15. The system of claim 12, wherein the magnitude of the received GPS signal portion stored in the second sample and hold circuit is adjusted as a function of the received GPS signal portion's storage time within the first sample and hold circuit.

16. The system of claim 15, wherein level adjusting comprises attenuating the magnitude of the received GPS signal portion stored in the second sample and hold circuit by an amount K:

$$K = e^{t/RC}$$

where t is the duration the received GPS signal portion is held in the first sample and hold circuit, R is the equivalent leakage resistance of the first sample and hold circuit, and C is the equivalent leakage capacitance of the first sample and hold circuit.

17. A computer program product, resident on a computer-readable medium, operable to execute instructions for acquiring a GPS signal having a predefined coarse acquisition frame period, the computer program product comprising:
  instruction code to receive a GPS signal portion over the coarse acquisition (C/A) frame period;
  instruction code to store the received GPS signal portion;
  instruction code to correlate the received GPS signal portion to each of a plurality of versions of a reference coarse acquisition (C/A) code to obtain a respective plurality of autocorrelation values; and
  instruction code to select a peak value among the autocorrelation values,
  wherein instruction code to correlate the received GPS signal portion comprises:
    (i) instruction code to correlate the received GPS signal portion to a reference coarse acquisition code to obtain a first autocorrelation value;
    (ii) instruction code to circularly-shift the reference coarse acquisition code to obtain a shifted reference coarse acquisition code;
    (iii) instruction code to correlate the received GPS signal portion to the circularly-shifted reference coarse acquisition code to obtain a second autocorrelation value and
    instruction code to repeat (ii) and (iii) until the reference C/A code has shifted through one complete revolution, whereby the received GPS signal portion is correlated to each of the reference and shifted versions of the C/A code.

18. The computer program product of claim 17, wherein the instruction code to store comprises instruction code to store the received GPS signal portion within each of at least first and second sample and hold circuits, the first and second sample and hold circuits triggered to sample the received GPS signal portion at different respective times.

19. The computer program product of claim 17, wherein the instruction code to selecting a peak value comprises:
  instruction code to compare the magnitude of the first and second autocorrelation values; and
  instruction code to select the larger of the first or second autocorrelation values.

20. The computer program product of claim 17 wherein the collective period over which the received GPS signal is correlated to each of the reference and shifted versions of the C/A code is less than or equal to the C/A frame period.

* * * * *